United States Patent
Rozario et al.

(10) Patent No.: US 6,173,378 B1
(45) Date of Patent: Jan. 9, 2001

(54) METHOD FOR ORDERING A REQUEST FOR ACCESS TO A SYSTEM MEMORY USING A REORDERING BUFFER OR FIFO

(75) Inventors: Ranjit J. Rozario, San Jose; Sridhar P. Subramanian, Sunnyvale; Ravikrishna Cherukuri, Milpitas, all of CA (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/151,861

(22) Filed: Sep. 11, 1998

(51) Int. Cl.[7] .................................................. G06F 12/00
(52) U.S. Cl. .......................... 711/163; 711/150; 710/5; 710/54; 365/230.05
(58) Field of Search ................................ 711/150, 163; 710/5, 54; 365/230.05

(56) References Cited

U.S. PATENT DOCUMENTS 5,809,278 * 9/1998 Watanabe et al. ................ 711/150
5,903,776 * 5/1999 Larson ................................. 710/54
6,047,334 * 4/2000 Langendorf et al. .................. 710/5

* cited by examiner

Primary Examiner—Do Hyun Yoo
Assistant Examiner—Mehdi Namazi
(74) Attorney, Agent, or Firm—Amin, Eschweiler & Turocy, LLP

(57) ABSTRACT

A method (320) of implementing a set of ordering rules for executing requests for access to a system memory (14) includes the steps of identifying a request status (322) for a new request for access to the system memory (14) and assigning a tag to the new access request (324) based on the status of the new request. A control circuit (106) inserts the new access request (340) into one of a read buffer (302) or a write buffer (304) at a specified location within one or the read or write buffers (302, 304) based on the status of the new access request. When the new access request is enqueued (342) and sent to an arbitration circuit (306), the requests are executed in an order with another access request (344) from the other of the read or write buffer based on the request status and the tag of the new request.

15 Claims, 13 Drawing Sheets

METHOD FOR ORDERING A REQUEST FOR ACCESS TO A SYSTEM MEMORY USING A REORDERING BUFFER OR FIFO

TECHNICAL FIELD OF THE INVENTION

The present invention relates generally to a graphics processing system and more particularly relates to a system and method for ordering a request for access to a system memory using a re-ordering buffer or FIFO.

BACKGROUND OF THE INVENTION

Computer applications are continuously being developed and many of these application are utilizing three dimensional (3-D) graphics. Providing the necessary lifelike 3-D graphics requires a continuous series of processor-intensive geometry calculations which delineate the position of an object in 3-D space. Generally, such calculations are performed by a system processor which is capable of executing the necessary floating point operations. Simultaneously, a graphics controller must process texture data in order to generate surfaces and shadows to make the object appear three dimensional. One important aspect of processing the texture data is the processing of texture maps, which are bit maps that describe the surfaces of the objects.

Texture map processing may include the retrieval of texels (e.g., texture elements) from a bit map, averaging the texels together based on a mathematical approximation of the location of the object which is needed in the image to generate data constituting a pixel, and writing the resulting pixel data as a frame to a local memory such as a frame buffer. The processing of texture maps was previously provided in a computer system 10 as illustrated in prior art FIG. 1 and involved five basic steps.

At Step 1, texture maps are read from a memory 12 such as a hard drive or disk drive into a system memory 14 via a bus 16 (such as a PCI bus) and a logic chip 18 (often called the core logic). When the texture map is to be used in Step 2, it is read from the system memory 14 into a CPU 20 which executes point-of-view type transformations on the texture map data and stores the results in cache. In Step 3, additional transforms, such as lighting and view point transforms, are applied to the cached texture map data and subsequently written back to the system memory 14. At Step 4, a graphics controller 22 reads the transformed texture data from the system memory 14 and writes it to a local video memory 24 such as a frame buffer over the PCI bus 16. At Step 5, the graphics controller 22 reads the texture data plus two dimensional color information from the frame buffer 24 and provides a frame which is written back to the frame buffer 24. The frame data is then read by a D/A converter within the graphics controller 22 to drive a display 26 with a 3-D image.

The prior art system 10 of processing texture maps has several undesirable features. First, texture data must be stored in both the system memory 14 and the frame buffer 24, thus resulting in redundant copies of the texture data and an inefficient utilization of memory resources. Second, the storing of the texture data in the frame buffer 24 limits the size of the texture data which is undesirable since demand is growing for more highly detailed textures which necessitates an expensive increase in the size of the frame buffer memory. Lastly, the bandwidth of the PCI bus 16 is limited to 132 Mbytes/second which limits the rate at which the texture map data can be transferred from the system memory 14 to the graphics controller 22. In addition, since various subsystems also utilize the PCI bus 16, the transfer of texture data must share the available PCI bandwidth, thus further limiting the 3-D graphics performance.

To address the above concerns with 3-D graphics performance, the PC platform now includes an accelerated graphics port (AGP) architecture. AGP relieves the above-described graphics bottleneck by adding a dedicated, high speed bus 30 between the core logic 18 and the graphics controller 22, as illustrated in the system 32 of prior art FIG. 2. The addition of the AGP bus 30 removes the bandwidth intensive 3-D and video traffic from the limitations of the PCI bus 16. In addition, AGP allows the texture data to be accessed directly by the graphics controller 22 from the system memory 14 rather than being prefetched to the frame buffer 24, thus requiring fewer texture maps to be stored in the local memory and eliminating the size constraints on the texture data.

In addition to the above benefits, the AGP bus 30 supports a data transfer rate of 533 Mbytes/second as opposed to 132 Mbytes/second by using both the rising and falling edges of the clock and managing the data transfer more efficiently. Furthermore, the texture data in the system memory 14 is dynamically allocated which enables the graphics controller 22 to see a virtual continuous space in the system memory 14 when in fact the pages are disjointed. This allocation allows the graphics controller 22 to access the texture data more efficiently. Consequently, AGP has been widely adopted and greatly improves the 3-D graphics performance.

The ordering rules for the processing of requests by the graphics controller in AGP differ from the CPU and PCI ordering rules. AGP supports two levels of access priority: high priority and low priority. For high priority requests, write and read requests are ordered separately. Consequently, the ordering of high priority read requests are made only with respect to other high priority read requests. Similarly, the ordering of high priority write requests are made only with respect to other high priority write requests and high priority read and write requests are handled independently. Low priority requests, however, are handled differently than the high priority requests. For low priority transactions, there is a relationship between read and write requests; particularly, write data is allowed to pass previously queued low priority read requests (e.g., read requests "push" write requests).

In order to implement the above AGP ordering rules, four separate queues are utilized in the control logic, wherein the queues store the high priority read requests, high priority write requests, low priority read requests and low priority write requests, respectively, as illustrated in prior art FIG. 3. As illustrated in prior art FIG. 3, the core logic 18 includes four separate access request queues 32, 34, 36 and 38, respectively. New access requests are stored in the appropriate queue according to its status (i.e., whether a read or a write request and whether the request is a high priority or a low priority request). Each queue 32, 34, 36 and 38 outputs its associated access request to an arbitration circuit 40 its earliest request, respectively (each queue operating as a first-in, first-out (FIFO) memory) and the arbitration circuit 40 uses the above-discussed ordering rules to select the proper access request. The post-queue arbitration methodology, however, is complicated and results in an extra clock cycle of latency which degrades the performance of the 3-D data transfers. In addition, the requirement of four queues requires a large number of gates which occupy significant die area.

It would be desirable to implement the AGP ordering rules without the disadvantages of the prior art.

SUMMARY OF THE INVENTION

The present invention is directed to a system for automatically ordering a request for access to a system memory. The system includes a re-ordering buffer and a set of pointers which identify the location for entry of a new access request based on whether the request is a high priority or a low priority request. Therefore arbitration of access requests is dynamically performed while being queued in a single buffer instead of having multiple queues for different priorities and performing arbitration after requests are enqueued as in the prior art. The present invention thus eliminates an extra buffer, saves silicon space and eliminates a clock cycle of latency due to the elimination of the post-queue arbitration logic.

According to one aspect of the present invention, the re-ordering buffer or FIFO has a data input and a data output. Associated with the re-ordering buffer are a set of pointers, a high priority pointer and a low priority pointer, which indicates the appropriate input position within the buffer for high priority and low priority access requests, respectively. For a new high priority access request, the low priority access requests already residing within the re-ordering buffer shift to allow room for entry of the request. The new high priority request will then be executed after earlier requested high priority requests are executed and before any low priority requests are executed. Therefore the buffer is dynamically re-ordered based on the priority of the new access request, thus effectively arbitrating between access requests before they are queued in the buffer. Consequently, the need for complicated post-buffer arbitration logic is eliminated.

According to another embodiment of the present invention, a method for ordering access requests from read and write request buffers in conformance with, for example, AGP ordering rules is disclosed. The access requests are ordered by assigning a tag to newly issued access requests, wherein the tag value is a function of the status of the request. After the access request is enqueued from its associated buffer, an order in which the access request is executed is determined based on the status and the tag of the access request.

The value of the tag which is assigned to new access requests preferably depends upon whether the new access request is a low priority write request. If the current request is a low priority write request and the previously issued low priority request was a read request, the tag value is incremented and attached to subsequent access requests. Consequently, whenever a low priority read request is to be executed, an arbitration circuit can compare the associated tag with the tag values of write requests in the write buffer to ensure that previously issued low priority write requests get executed before the read request to conform to the AGP ordering rules.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages, and novel features of the invention will become apparent from the following detailed description of the invention when considered in conjunction with the drawings.

DETAILED DESCRIPTION OF THE INVENTION

Figure 1:
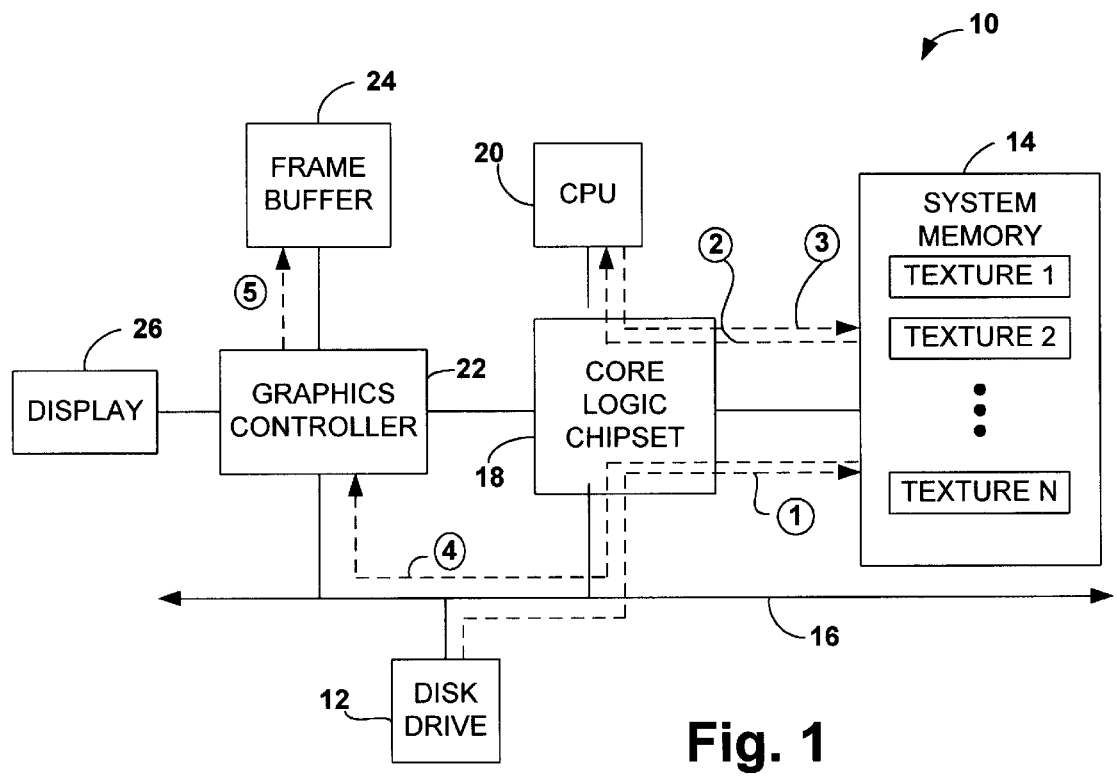
FIG. 1 is a block diagram illustrating a prior art traditional computer platform and a procedure for transferring texture data from a system memory to a frame buffer for three dimensional graphics capability.
Figure 2:
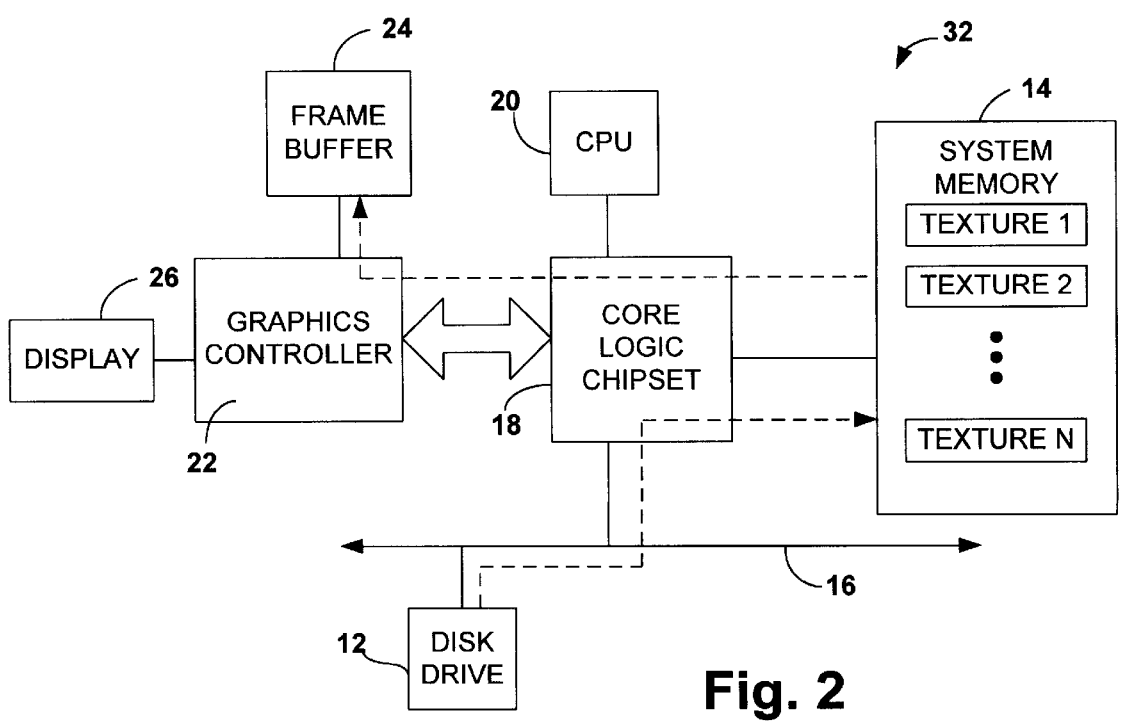
FIG. 2 is a block diagram illustrating a prior art accelerated graphics port computer platform and a procedure for transferring texture data from a system memory to a frame buffer for three dimensional graphics capability.

The following is a detailed description of the present invention made in conjunction with the attached Figures, wherein like reference numerals will refer to like elements throughout. The present invention is directed toward a system using two re-ordering buffers for storing requests for access to a system memory. The read and write access requests are each have a status which is analyzed and a tag associated with the request status are attached to the requests and inserted, respectively, within an associated buffer at a specified location as a function of their priority. The access requests are then enqueued from the buffers and sent to an arbitration circuit which orders the enqueued access requests based on the status and the tags of the requests.

More particularly, the present invention is preferably directed toward ordering the access requests in conformance with the AGP ordering rules. Read and write access requests having a status such as high or low priority are analyzed by a control circuit. Based on the status of the access requests, a tag having a particular value is attached to the requests, which are then inserted into the appropriate buffer, wherein their insertion location is a function of the priority of the requests. Upon being enqueued, the read and write requests are transmitted to an arbitration circuit which orders the requests in accordance with the AGP ordering rules using the priority and the tag value of the various requests. For example, the arbitration circuit executes high priority requests on a first-come, first-serve basis while high priority requests take precedence over low priority requests. When two low priority requests are competing, a previously issued write request takes precedence over low priority read requests. The low priority request arbitration is effectuated using the status of the requests and the value of the tags associated with the requests. If a low priority read request is to be executed, the arbitration circuit compares its tag to the tags associated with the write requests and if a tag match is found, the read request is held while the matching requests are executed first. Further details of the present invention follow below.

Figure 4:
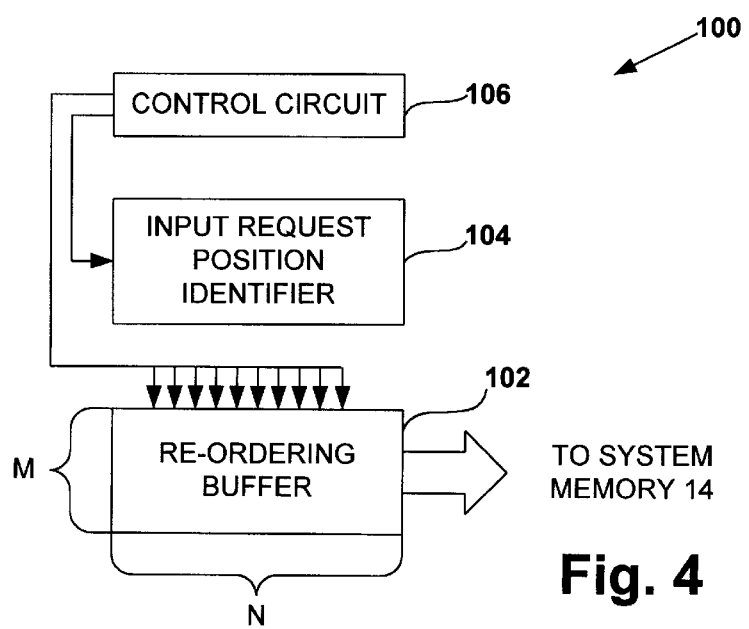
FIG. 4 is a block diagram illustrating a system for ordering a request for access to a system memory according to the present invention.

Turning now to the Figures, FIG. 4 is a block diagram illustrating a system 100 for re-ordering a request queue in response to a new access request to system memory. The system 100 includes a re-ordering buffer 102 having a plurality of entries (N) wherein each entry is M bytes wide. The buffer 102 stores requests for access to the system memory which originate from the graphics controller 22. For example, an access request may be a request to retrieve one or more pieces of texture data from the system memory (i.e., a read request and thus the buffer 102 is a read buffer). Alternatively, an access request may be a request to transfer one or more pieces of texture data to the system memory (i.e., a write request and thus the buffer 102 is a write buffer). An input request position identifier 104 is associated with the buffer 102 and indicates the proper location within the buffer 102 for entry of a new access request. The request position identifier 104 identifies the entry position within the buffer 102 based on the priority of the access request Preferably, the system 100 operates with two priorities, high priority and low priority access requests. Alternatively, however, a greater number of priorities may be used and such configurations are contemplated as falling within the scope of the present invention.

Figure 3:
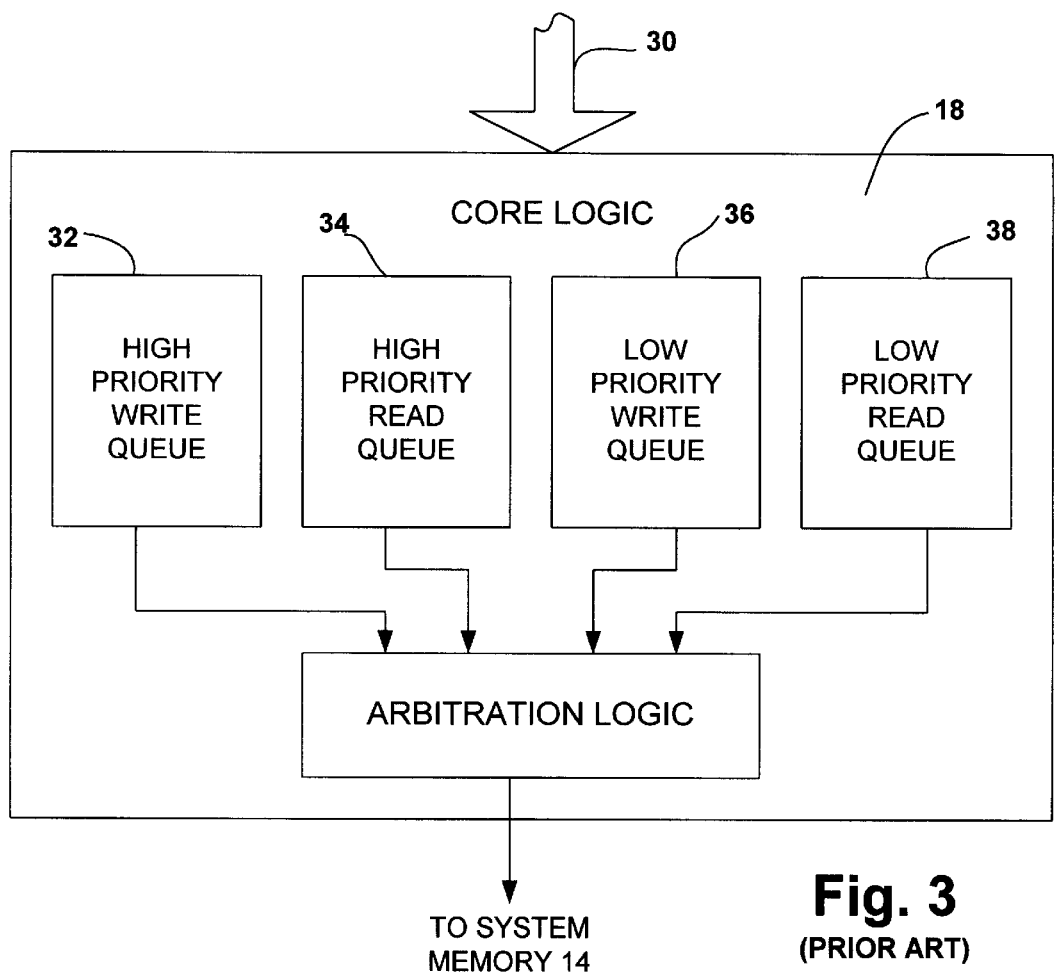
FIG. 3 is a block diagram illustrating a prior art access request queuing system using multiple queues and an arbitrating circuit for ordering read and write access requests having differing priorities.

A control circuit 106 is coupled to both the buffer 102 and the request position identifier 104. The control circuit 106 provides an indication of whether a new access request is to be written to the buffer 102 or whether the request at a buffer output is to be read from the buffer 102. In addition, the control circuit 106 provides an indication of the priority of the access request when a new request is to be written to the buffer 102. Based on the priority of the new access request, the request position identifier 104 indicates the proper input position within the buffer 102. Preferably, the request position identifier 104 is a pair of pointers which point to the position where the last access request was input for each priority, respectively. Alternatively, however, other mechanisms for tracking the proper input positions within the buffer 102 may be utilized and are contemplated as falling within the scope of the present invention. For example, the request position identifier 104 may be one or more counters which increment or decrement as access requests are written to and read from the buffer 102. Lastly, the control circuit 106 transfers the new access requests to input positions in the buffer 102 based on the information provided by the request position identifier 104. Therefore the system 100 orders new access requests as they enter the buffer 102 which eliminates the need for post-queue priority arbitration logic for read and/or write requests, respectively. In addition, incorporating all read requests into a single buffer and all write requests within a single buffer reduces the four (4) queue system of prior art FIG. 3 to reduce down to two buffers, wherein a single buffer exists for read access requests and another buffer exists for write access requests, thus saving silicon area.

The buffer 102 behaves generally as a first-in, first-out (FIFO) memory. That is, the access requests which are first entered or queued into the buffer 102 get executed first. Thus no post-queue priority arbitration need be performed. The buffer 102 differs slightly from standard FIFOs because a new access request to the buffer 102 may cause a re-ordering of the requests already residing within the buffer 102 depending on the priority of the new access request. For example, if a new access request is a low priority request, the control circuit 106 indicates that a low priority request will be transferred to the buffer 102 and looks to the input request position identifier 104 to determine the appropriate input position for the low priority request, which will be behind the most recently transferred low priority access request. Since the access request is a low priority request, no re-ordering of the buffer 102 is necessary.

Alternatively, if a new access request is a high priority request, the control circuit 106 indicates that a high priority request will be transferred to the buffer 102 and looks to the input request position identifier 104 to determine the appropriate input position for the high priority request. Because the new access request is a high priority request, it will be sent to the buffer 102 at a position which is after the most recently transferred high priority request, but before all the low priority requests regardless of how long the low priority requests have been queued. Thus the present invention performs a pre-queue type arbitration by determining the appropriate location within the buffer 102 for the new access request based upon its priority.

Figure 5:
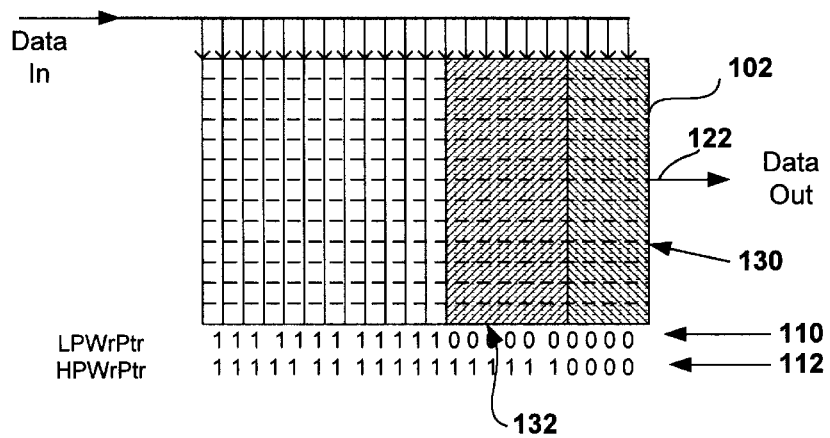
FIG. 5 is a block diagram illustrating a re-ordering buffer or FIFO and an associated set of pointers according to the present invention.

FIG. 5 is block level diagram which illustrates in greater detail the manner in which the buffer 102 operates and how a set of pointers 110 and 112 may be utilized to implement the request position identifier 104 of FIG. 4 to indicate the position for new access request transfers to the buffer 102. The buffer 102 includes a data input 120 having an input position which depends upon the priority of the access request and the present status of the buffer 102. The buffer 102 also includes a data output 122 where the access requests exit the buffer 102 for execution. The buffer 102 further includes a high priority portion 130 consisting of one or more pending high priority access requests. The high priority portion 130 exists only when all the high priority requests have not yet been executed. Similarly, the buffer 102 includes a low priority portion 132 consisting of one or more pending low priority access requests and the low priority portion 132 exists only when all the low priority requests have not yet been executed.

The pointers 110 and 112 of FIG. 5 are a low priority write pointer (LPWrPtr) and a high priority write pointer (HPWrPtr), respectively. Consequently, the buffer 102 of FIG. 5 according to this exemplary embodiment, is a write buffer which contains requests to write texture data to the system memory. Alternatively, however, the present invention is equally applicable to a read buffer which is also contemplated as falling within the scope of the present invention. The pointers 110 and 112 preferably behave as shift registers wherein a binary value is shift in from the right resulting in a plurality of bytes (i.e., words), the value of which are indicative of the position of the high priority portion 130 and the low priority portion 132 within the buffer 102.

For example, at system reset all the bytes in the shift registers are set to a high binary value (e.g., "111 . . . 1"). Each time a high priority access request gets written to the buffer 102, both pointers 110 and 112 get a low binary value (e.g., a "0") shifted in from the right (e.g., "111 . . . 0"). Therefore when the next access request is to be written to the buffer 102, the pointers 110 and 112 will indicate the position within the buffer 102 for the request. In contrast, when a low priority access request is written to the buffer 102, the low priority write pointer 110 (LPWrPtr) shifts a low binary value in from the right, and the high priority write pointer 112 does not change. Thus the shifting dynamics of the pointers 110 and 112 differ to properly reflect the appropriate input positions for new access requests based on the priority of the new access requests.

When an access request is read out from the buffer 102, both pointers 110 and 112 shift a high binary value (e.g., a "1") in from the left. An exemplary Truth Table for the write pointer shifting is illustrated below as Table 1. In Table 1, "Fifo Wr" represents the status of whether or not an access request is being written to the buffer 102 (Fifo Wr=1 indicates a write to the buffer 102) and "FifoRd" represents the status of whether an access request is being read from the buffer 102. Fifo Wr and FifoRd are not necessarily the opposite of one another because the system 100 allows a write and a read to occur at the same time. Lastly, when a write is occurring (FIFOWr=1), "Pri" represents the priority of the new access request.

TABLE 1

| FifoWr | Pri | FifoRd | LPWrPtr | HPWrPtr |
|--------|-----|--------|---------|---------|
| 0 | x | 0 | No Change | No Change |
| 1 | 0 | 0 | Shift Left | No Change |
| 1 | 1 | 0 | Shift Left | Shift Left |
| 0 | x | 1 | Shift Right | Shift Right |
| 1 | 0 | 1 | No Change | Shift Right |
| 1 | 1 | 1 | No Change | No Change |

Figure 6:
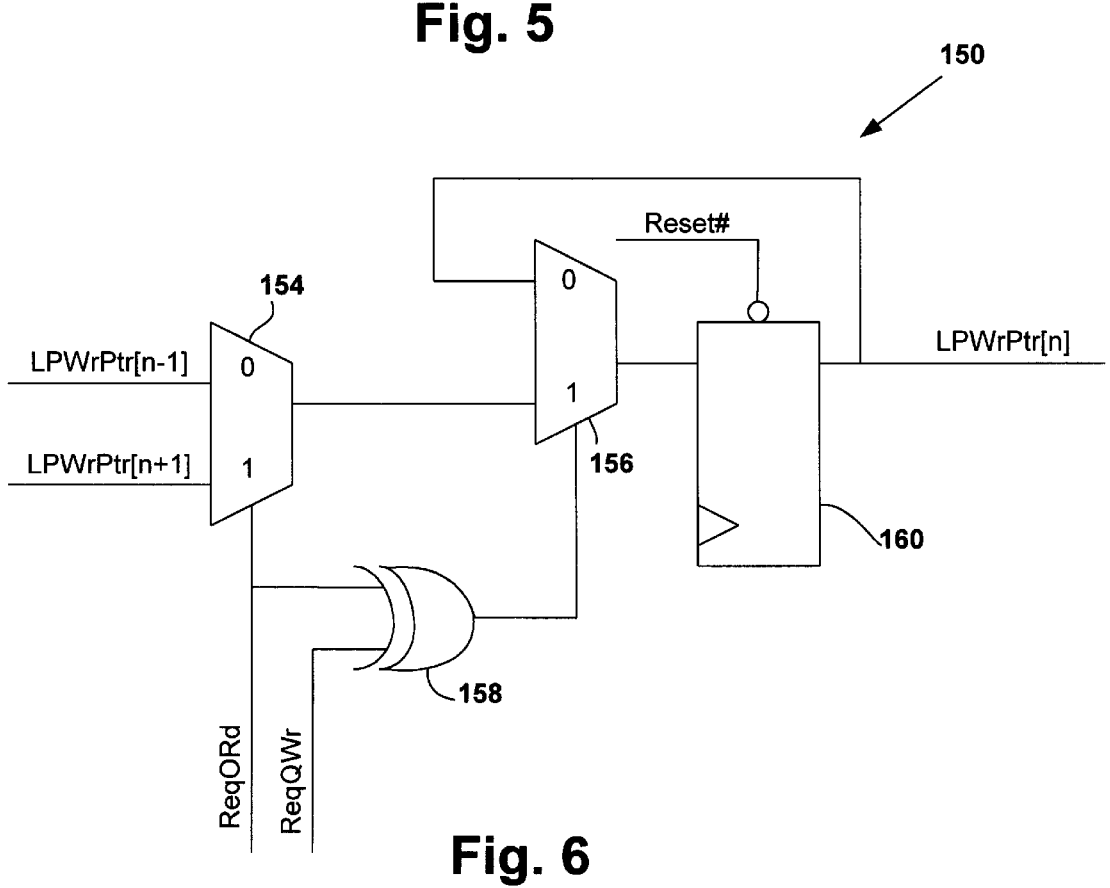
FIG. 6 is a circuit diagram illustrating a circuit for shifting a low priority pointer in response to a read operation from the buffer or a write operation to the buffer in accordance with an exemplary embodiment of the present invention.
Figure 7:
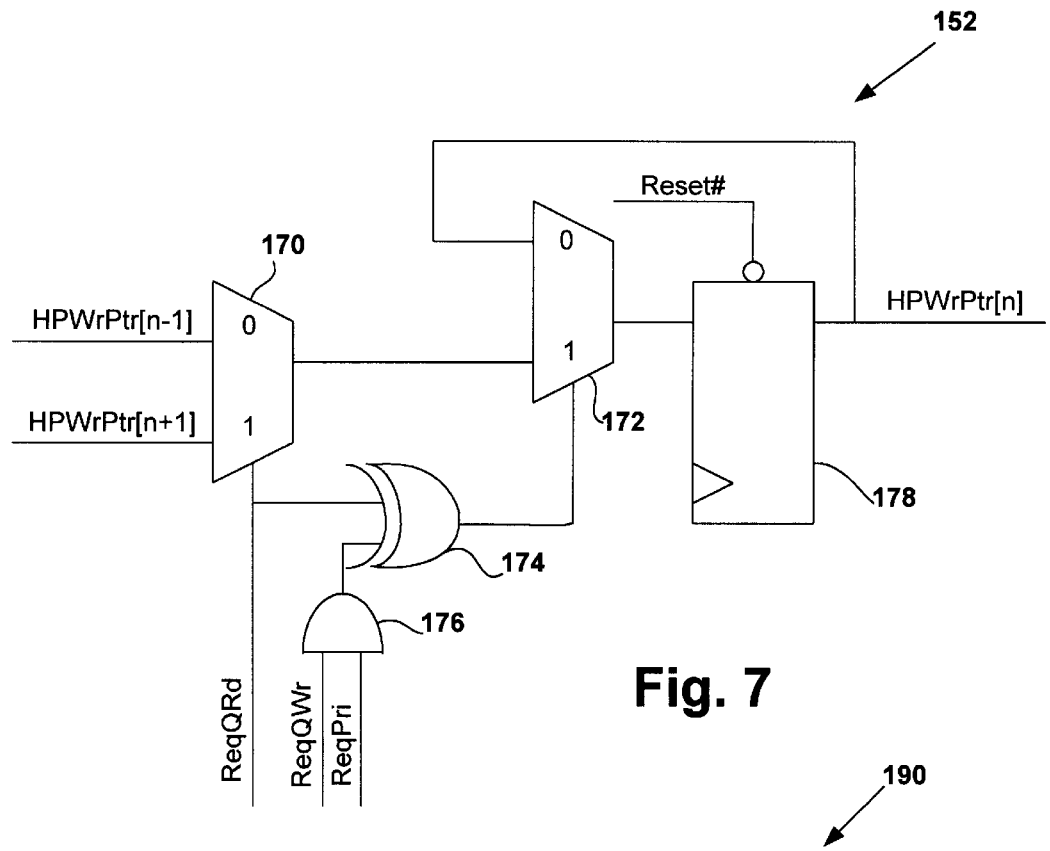
FIG. 7 is a circuit diagram illustrating a circuit for shifting a high priority pointer in response to a read operation from the buffer or a write operation to the buffer in accordance with an exemplary embodiment of the present invention.

Exemplary circuits 150 and 152 for implementing the shifting dynamics of the pointers 110 and 112 are illustrated in FIGS. 6 and 7, respectively. FIG. 6 illustrates a single cell 150 for the low priority write pointer 110. The circuit 150 represents the $n^{th}$ byte in the low priority pointer shift register with the "n+1" byte being located to its left and the "n−1" byte located to its right. The circuit 150 includes two multiplexers 154 and 156, an exclusive OR gate 158 and a D-type latch 160. The first multiplexer 154 receives as inputs the values of the neighboring shift register cells (n−1) and (n+1) and the multiplexer 154 is controlled by a control signal (ReqQRd) from the control circuit 106 of FIG. 4. When a read operation is to be performed, ReqQRd is high ("1") and is otherwise low ("0"). Thus, the multiplexer 154 passes the value of the "n−1" cell for a write operation and passes the value of "n+1" cell for a read operation, which becomes an input for the second multiplexer 156.

The second multiplexer 156 has an input which represents the value within the present cell (n) and either the value of (n+1) or (n−1) from the first multiplexer 154 depending on whether or not a read operation is being performed. The second multiplexer 156 is controlled by the output of the exclusive OR gate 158 which receives the ReqQRd signal and a ReqQWr signal as inputs. The ReqQWr signal also comes from the control circuit 106 of FIG. 4 and is high ("1") when a write operation is to be performed and is low ("0") otherwise. Due to the operation of the exclusive OR gate 158, the output of the gate 158 is low ("0") whenever neither a read nor a write operation is being performed or when both are occurring simultaneously. Otherwise, if either a read or write operation is being performed, the output of the gate 158 is high ("1"). Consequently, whenever no action is taking place (gate 158 is low "0") the second multiplexer 156 selects the value already residing in cell "n" and passes it to the latch 160. Thus the value within the $n^{th}$ cell remains the same. Likewise, if both a read and a write operation is occurring at the same time, the gate 158 is low and again the multiplexer 156 selects the value residing in cell "n" and the value stays the same.

On a macroscopic level therefore, no shifting occurs for the low priority pointer 110 when either no action occurs or when both a read and a write occur at the same time. If, however, a read or a write is occurring alone, the output of the gate 158 is high ("1") and the second multiplexer 156 outputs the value provided by the first multiplexer 154. Therefore if a read operation is occurring, the value in the "n+1" cell (i.e., the cell on the left) is selected and passed to the latch 160. Alternatively, if a write operation is being performed, then the value in the (n−1) cell (i.e., the cell on the right) is selected and passed to the latch 160. Consequently, for reads, a "1" is shifted in from the left and for writes, a "0" is shifted in from the right.

The circuit 152 of FIG. 7 is the circuit which characterizes the shifting dynamics of the high priority pointer 112 of FIG. 5. Because the high priority pointer 112 only shifts to the left for high priority write operations as opposed to the low priority pointer 110 which shifts for all types of writes independent of the priority of the write operation, the circuit 152 of FIG. 7 must take into account the priority of new access requests which are written to the buffer 102. The circuit 152 represents the $n^{th}$ cell in the high priority pointer shift register. The circuit 152 includes two multiplexers 170 and 172, an exclusive OR gate 174, an AND gate 176 and a D-type latch 178. The first multiplexer 170 operates in the same manner as the multiplexer 154 of FIG. 6, except it passes the values in the neighboring high priority pointer cells (n−1) and (n+1), respectively. The ReqQWr signal and a priority signal ReqPri are input to the AND gate 176 from the control circuit 106 of FIG. 4. The ReqPri signal is high ("1") when the new access request is a high priority request and is low ("0") when the new request is a low priority request. Because the ReqPri signal is ANDed together with the ReqQWr signal, the output of the AND gate 176 is high when a high priority write operation is to be performed and is low otherwise. This value then forms an input to the exclusive OR gate with the ReqQRd signal. The output of the exclusive OR gate 174 is thus high only if a high priority write operation is occurring or if a read operation is occurring, but not if both occur simultaneously.

The output of the exclusive OR gate 174 controls the second multiplexer 172. If either a high priority write operation or a read operation is being performed, the second of shifters which preferably comprise the buffer 102, the right most entry (where access requests are read out of the buffer 102) always has its previous pointer tied to logic "0" (shifting in a "0" from the right) and the left most entry has its "next pointer" tied to logic "1" (shifting in a "1" from the left).

TABLE 2

| Write Req | Pri | Next LPWrptr | LPWrPtr | Previous LPWrPtr | Next HPWrPtr | HPWrPtr | Previous HPWrPtr | Read Req | Data Bits |
|---|---|---|---|---|---|---|---|---|---|
| 0 | x | x | x | x | x | x | x | 0 | No Change |
| 1 | 0 | x | 0 | x | x | x | x | 0 | No Change |
| 1 | 0 | x | 1 | 0 | x | x | x | 0 | Write Data |
| 1 | 0 | x | 1 | 1 | x | x | x | 0 | Don't Care |
| 1 | 1 | x | x | x | x | 0 | x | 0 | No change |
| 1 | 1 | x | x | x | x | 1 | 0 | 0 | Write Data |
| 1 | 1 | x | x | x | x | 1 | 1 | 0 | Shift Left |
| 0 | x | x | x | x | x | x | x | 1 | Shift Right |
| 1 | 0 | 0 | x | x | x | x | x | 1 | Shift Right |
| 1 | 0 | 1 | 0 | x | x | x | x | 1 | Write Data |
| 1 | 0 | x | 1 | x | x | x | x | 1 | No Change |
| 1 | 1 | x | x | x | 0 | x | x | 1 | Shift Right |
| 1 | 1 | x | x | x | 1 | 0 | x | 1 | Write Data |
| 1 | 1 | x | x | x | x | 1 | x | 1 | No Change (n) Write Data (0) | multiplexer 172 passes the output of the first multiplexer 170 to the latch 178 which then becomes the value in the $n^{th}$ cell. Thus, if a high priority write occurs, the value in the (n−1) becomes the value in the cell "n" which is equivalent to a "0" being shifted in from the right and the value of each cell shifting to the left. Alternatively, if a read occurs, the value in cell (n+1) becomes the value in cell "n" which is equivalent to a "1" being shifted in from the left and the value of each cell being shifted to the right. If, however, neither a high priority write operation nor a read operation is being performed, the output of the exclusive OR gate 174 is low and the second multiplexer 172 outputs the value within the cell "n", which effectively results in no shifting. Although the operation of the above pointers 110 and 112 has been described in conjunction with an exemplary embodiment in FIGS. 6 and 7, other input access request position identifiers may be utilized and such alternative mechanisms and/or circuits are contemplated as falling with the scope of the present invention.

Returning to FIG. 5, the buffer 102 is preferably composed of a matrix of shifting elements that can shift data values to the left and to the right, respectively. For example, if the buffer is N entries deep and M bits wide, the number of shifting elements in the matrix is N×M. The buffer 102 holds both high priority and low priority access requests and the pointers 110 and 112 indicate the proper input position for the access request based on its priority so that arbitration of a new access request is effectively performed prior to being queued.

Each entry into the buffer 102 (i.e., a new access request) is controlled by the logic circuit 106 of FIG. 4 and is based on the priority of the write request and the status of the pointers 110 and 112. In addition, each exit of an access request (i.e., a read operation) is controlled by the logic circuit 106. A truth table for the control logic within the logic circuit 106 of FIG. 4 is provided below in Table 2 for a cell entry "n", wherein the "previous pointer" represents the cell to the right and the "next pointer" represents the cell to the left. Note that in understanding the operation of the matrix When the truth table of Table 2 indicates the data bytes within the buffer 102 should shift (either right or left) a ShiftEn signal will go high ("1"), otherwise when "No change" is the proper response, the ShiftEn signal will go low ("0"). In addition, when the control circuit 106 determines that bytes for the $n^{th}$ entry are to shift right, a SL/SR# signal goes low and if a shift left is determined by the control circuit 106, the SL/SR# signal is high. Lastly, when a write operation is to be performed, a WriteEn signal goes high and is otherwise low. The details of the control logic control circuit 106 is not illustrated or described further for the sake of brevity. Such control circuitry, however, may be easily configured by those of ordinary skill in the art and in light of the information provided in Table 2 above.

Figure 8:
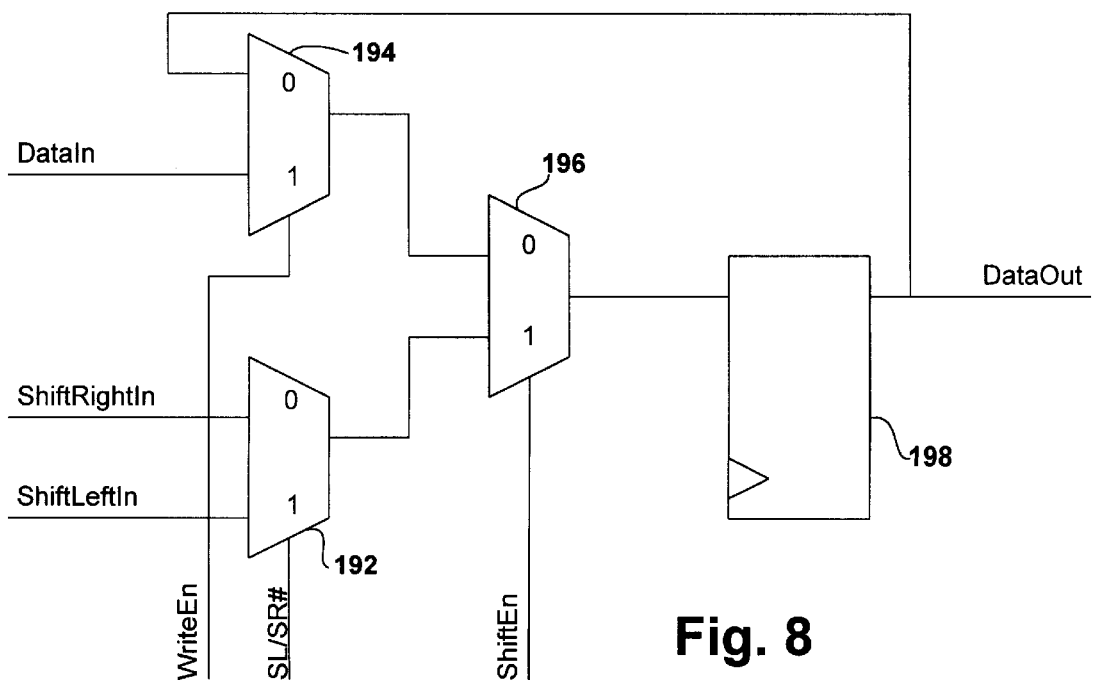
FIG. 8 is a circuit diagram illustrating a data storage cell with associated shifting control circuitry for shifting data in the re-ordering buffer in response to a read operation from the buffer or a write operation to the buffer according to the present invention.

In light of the above control circuit functionality, the operation of an $n^{th}$ cell 190 within the matrix of shifting elements will be described in conjunction with FIG. 8. The cell 190 includes three multiplexers 192, 194 and 196, respectively and a D-type latch 198. The first multiplexer 192 has two inputs which form ShiftRightIn and ShiftLeftIn terminals for the cell 190. The ShiftRightIn terminal is coupled to the DataOut terminal of the cell immediately to its left (i.e., cell "n+1") and the ShiftLeftIn terminal is coupled to the DataOut terminal of the cell immediately to its right (i.e., cell "n−1"). The first multiplexer 192 is controlled by the SL/SR# signal and thus controls whether the data within a cascade of cells similar to cell 190 shift to the left (to allow room for a new, higher priority access request) or to the right (in response to an access request being executed).

The second multiplexer 194 has one input coupled to the DataOut of the cell 190 and a second input which is the DataIn terminal and is coupled to the control circuit 106 of FIG. 4. When a new access request is to be written to the buffer 102, the appropriate bit of the new access request is transmitted to the element 190 through the DataIn terminal. The second multiplexer 194 is controlled by the WriteEn signal. Thus when the control circuit 106 wishes to write a new access request to the buffer 102, WriteEn goes high and passes the value on the DataIn terminal to the third multiplexer 196. Otherwise, the present value of the cell (DataOut) is passed.

The third multiplexer 196 receives as inputs the outputs of the first and second multiplexers 192 and 194, respectively. The third multiplexer 196 is controlled by the ShiftEn signal. Thus, if the control circuit 106 dictates that data must be shifted to the left to accommodate a new access request having a higher priority, the SL/SR# signal and the ShiftEn signal go high and the value at ShiftLeftIn (the value in the element located to the right (n−1)) is passed to the latch 198. Similarly, if the elements are to shift to the right due to the execution of an access request, the value at ShiftRightIn is passed to the latch 198.

When the control signal to the third multiplexer 196 (ShiftEn) is low, the third multiplexer 196 selects the output of the second multiplexer 194. In this mode either the same data value is maintained ("no change") or a data bit associated with a new access request from DataIn is passed to the third multiplexer 196.

Figure 9:
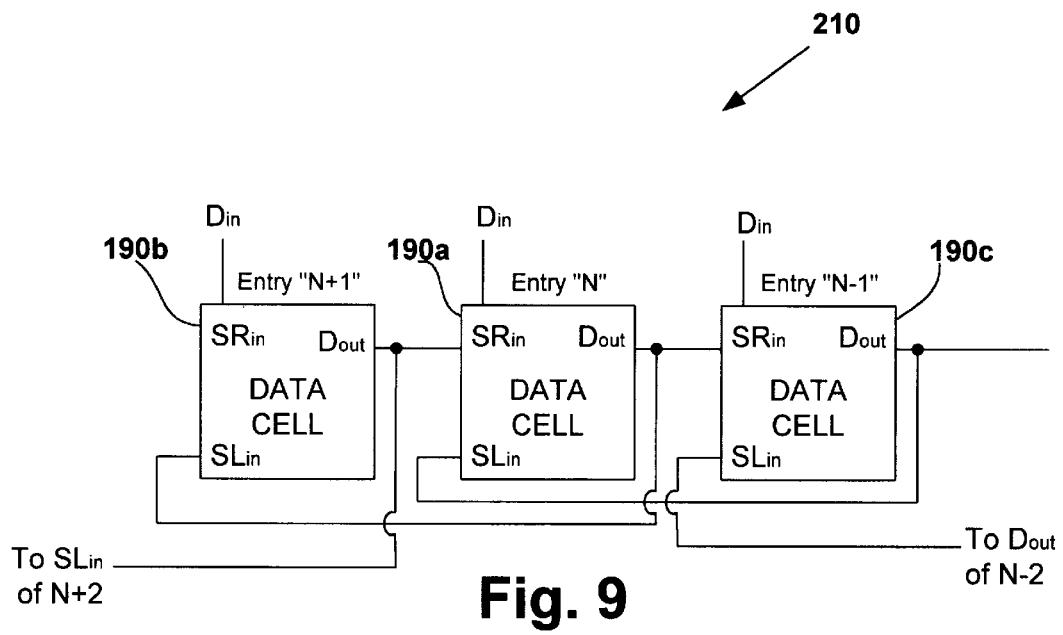
FIG. 9 is a block diagram illustrating an interconnection of data storage cells in the re-ordering buffer according to the present invention.

As discussed supra, data is passed from one element within the matrix of elements to another to re-order access requests within the buffer. Note that the element 190 of FIG. 8 represents only a single cell within the matrix which makes up the buffer 102. To better understand the operation of the cell 190 in context, FIG. 9 represents a circuit 210 of cascaded elements 190a–190c, respectively. In FIG. 9, element 190a represents the $n^{th}$ cell, wherein elements 190b and 190c represent cells (n+1) and (n−1), respectively. Note that in the cascade arrangement, the cells represent an individual data bit for three different access requests. Since access requests preferably consist of multiple bit words, the arrangement illustrated in FIG. 9 is preferably extended in a two-dimensional matrix.

The DataOut of cell 190a ($D_{out}$) is coupled to the ShiftRightIn ($SR_{in}$ in FIG. 9 for simplicity) of the cell 190c to the right and to the ShiftLeftIn ($SL_{in}$ in FIG. 9) of the cell 190b to the left. As discussed above with regard to FIG. 8, the data bits are shifted to the left or right as specified by the control circuit 106 to re-order or execute access requests. New access requests may be input to any one of the three cells 190a–190c through the DataIn ($D_{in}$) terminals as specified by the control circuit 106, thus allowing for a dynamic allocation of new requests into the buffer 102 based on the priority of the new request.

Figure 10:
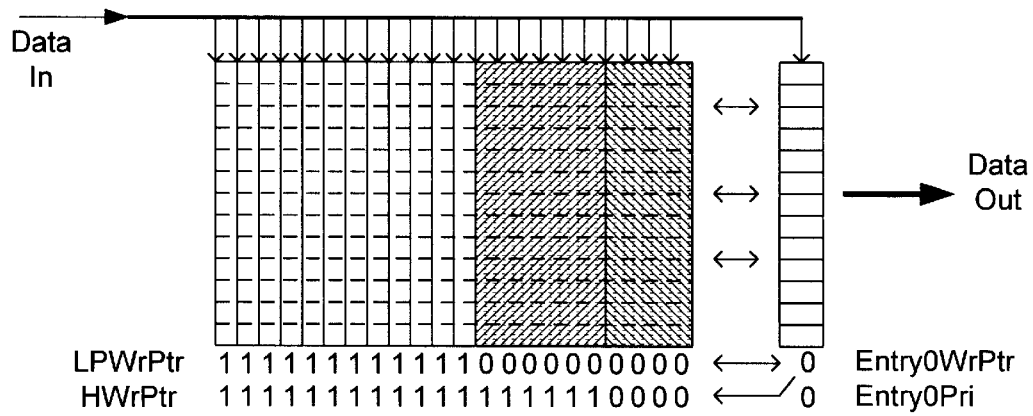
FIG. 10 is a block diagram illustrating a re-ordering buffer or FIFO according to another embodiment of the present invention.

In some circuit designs, there is a desire for an access request at position or entry "0" in the buffer 102 (i.e., the position in the buffer 102 in which the access request is next in line to be executed) to remain stable. Therefore in such a design, regardless of the priority of a new, incoming access request, the request at position "0" will not change. The system 220 of FIG. 10 illustrates the buffer 102 having this unique control methodology, wherein a single pointer 222 exists for entry "0" in the buffer 102. Note that the buffer 102 of FIG. 10 is the same as the buffer 102 of FIG. 5, wherein FIG. 10 illustrates entry "0" separate from the buffer 102 solely for illustration purposes. In system 220, entry "0" has a single pointer bit (e.g., Entry0WrPtr) instead of one pointer bit per priority which exist for the remaining entry positions 1, 2, . . . n. In addition, entry "0" has a bit that indicates the priority of the access request which resides within the entry (Entry0Pri, wherein "1" indicates a high priority request and a "0" indicates a low priority request).

In operation, the value within the Entry0WrPtr gets shifted into both the low priority and the high priority pointers 110 and 112, as illustrated in FIG. 10. Thus the pointer for entry "0" is used as the "shift-in" for both the high priority and the low priority pointers for entry "1". The priority bit and the value within entry "0" follow the truth table illustrated in Table 3 below.

TABLE 3

| FifoWr | Pri | FifoRd | Entry0WrPtr | Entry0Pri | Entry0Data |
|---|---|---|---|---|---|
| 0 | x | 0 | x | No Change | No Change |
| 1 | x | 0 | 0 | No Change | No Change |
| 1 | 1 | 0 | 1 | Write Pri | Write data |
| x | x | 1 | x | Shift Right | Shift Right |

As can be seen from Table 3, when a write operation occurs to the buffer 102 when a stable entry exists within entry "0", no change occurs in the Entry0Data, regardless of the priority of the new access request. Instead, an access request is only written to Entry "0" when the buffer 102 is empty (i.e., Entry0WrPtr=1). A detailed description of the logic used to effectuate the results of the above truth table are omitted for the sake of brevity. It is understood, however, that one of ordinary skill in the art could easily construct such logic circuitry given the discussion and truth table above.

Figure 11:
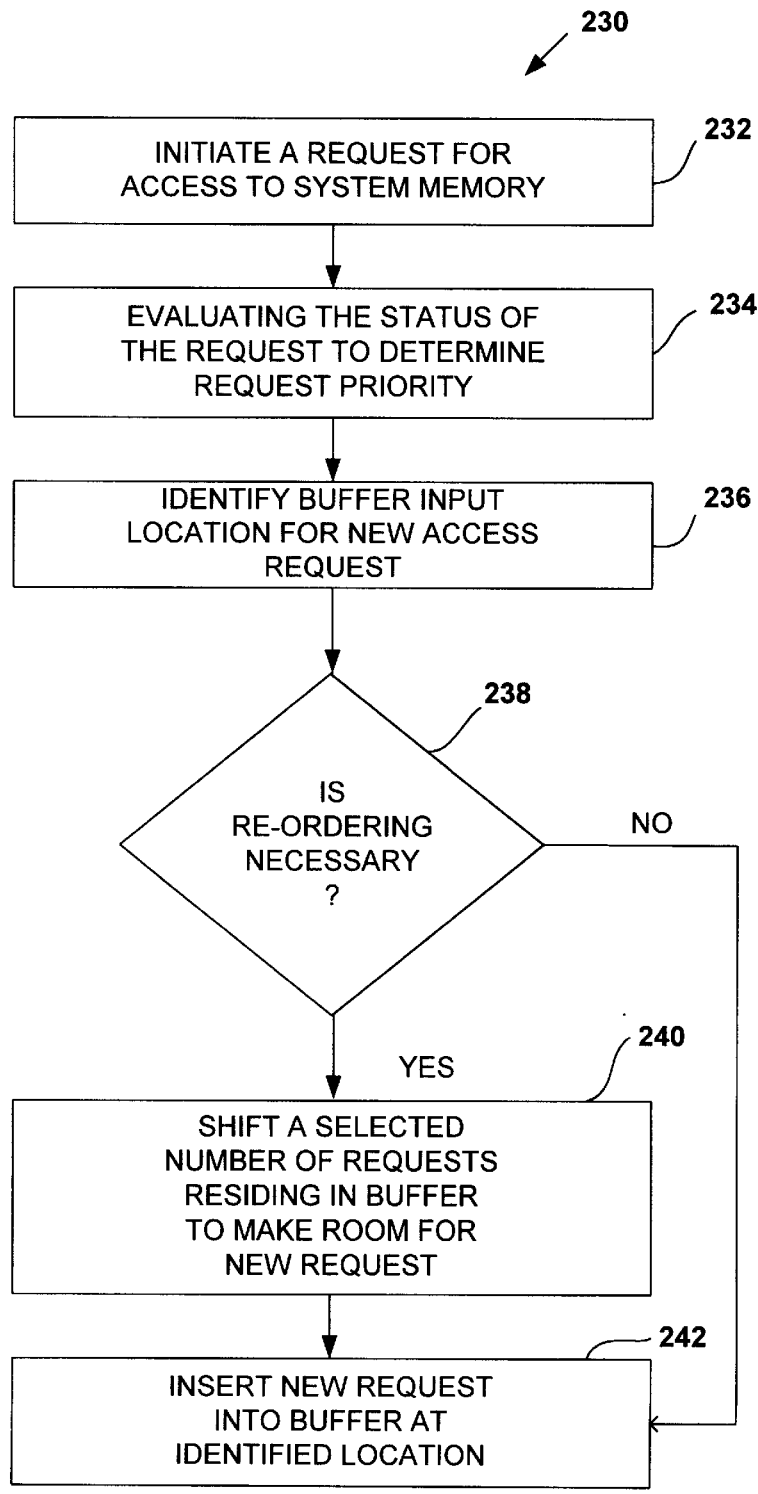
FIG. 11 is a flow chart diagram illustrating a method of ordering an access request to a system memory in a buffer according to the present invention.

As discussed above in conjunction with FIGS. 4–10, the present invention includes a system for re-ordering a buffer used to store access requests to a system memory. In addition, the present invention can also be characterized broadly as a method of ordering access requests in a FIFO or buffer. Such a method 230 is illustrated in the flow chart of FIG. 11. The method 230 begins with the initiation of a request to access the system memory 14 at step 232. The request is typically initiated by the graphics controller 22 and sent to the core logic 18. The core logic 18, preferably via the control circuit 106 of FIG. 4, then evaluates the request to determine whether it is a high or low priority request at step 234. The evaluation step 234 may include, for example, evaluating the state of a priority bit. Other evaluation method, however, may alternatively be employed and are contemplated as falling within the scope of the present invention.

Once the priority of the new access request is determined at step 236, the appropriate position or input location within the buffer 102 is identified at step 238. Preferably, step 238 is accomplished using or more sets of pointers 110 and 112, as illustrated in FIG. 5. Alternatively, other methods or circuits may be utilized to identify the input position based on the priority of the access request and such alternatives are contemplated as falling within the scope of the present invention. Based on the input location identification at step 236, a query is made whether a re-ordering of the buffer 102 is necessary at step 238. Preferably, this query is performed by the control circuit 106 within the core logic 18.

If re-ordering is necessary (YES), a selected number of requests, preferably associated with lower priority access requests, are shifted within the buffer 102 to make room for the new request at step 240. Although the step of re-ordering is preferably based on the priority of the access request, other criteria may be utilized and ordering within the buffer 102 may be implemented based on those alternative criteria. The new request is then inserted into the identified location within the buffer 102 at step 242. In the event that re-ordering of the buffer 102 is not necessary to place the new request within the buffer 102 (NO at step 238), the method 230 continues to step 240 in which case the new access request is inserted into the buffer 102.

Figure 12:
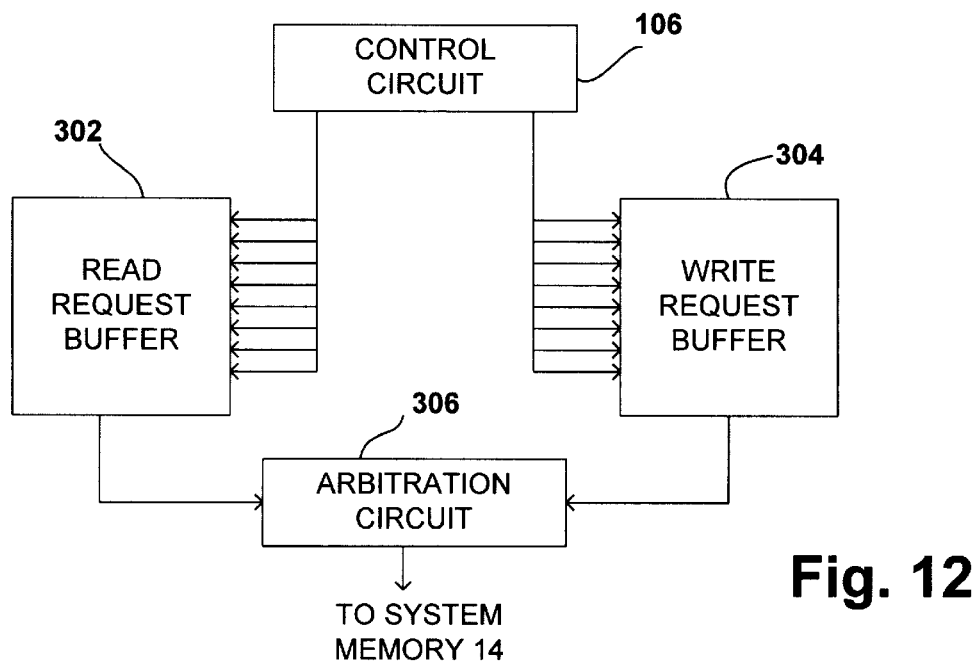
FIG. 12 is a block diagram illustrating a system having a re-ordering write buffer and a re-ordering read buffer with an arbitration circuit according to the present invention.

As discussed above, the re-ordering buffer allows high priority or low priority requests of a single type (e.g., read or write requests) to be handled by a single buffer by identifying the priority of the request and ordering the buffer to properly accommodate the request as it enters the buffer. Thus all requests (both read and write requests) may be handled by a system having two buffers, as illustrated in FIG. 12. In FIG. 12, a system 300 includes the control circuit 106 of FIG. 4, a read request buffer 302, a write request buffer 304 and an arbitration circuit 306. As discussed above in conjunction with FIGS. 4–11, the control circuit 106 transfers the access requests along with the appropriate control signals to the appropriate buffers 302 and 304. The access requests, after their insertion into the buffers, then exit the buffers 302 and 304 in a typical FIFO fashion and are transmitted to the arbitration circuit 306 which determines which request (e.g., the latest issued read request which exited the read buffer 302 or the latest issued write request which exited the write buffer 304) should be executed. The arbitration circuit 306 then preferably selects the appropriate access request in order to conform with the AGP ordering rules. Note the distinction between the block diagram of prior art FIG. 3 and FIG. 12 of the present invention. By reducing the number of buffers from four (4) to two (2), die area is reduced. In addition, by performing the high priority/low priority request re-ordering as requests are input into the buffers 302 and 304, the subsequent arbitration performed by the arbitration circuit 306 is greatly simplified and can be performed within a single clock cycle, thus removing a clock cycle of latency which improves the system performance.

Figure 13:
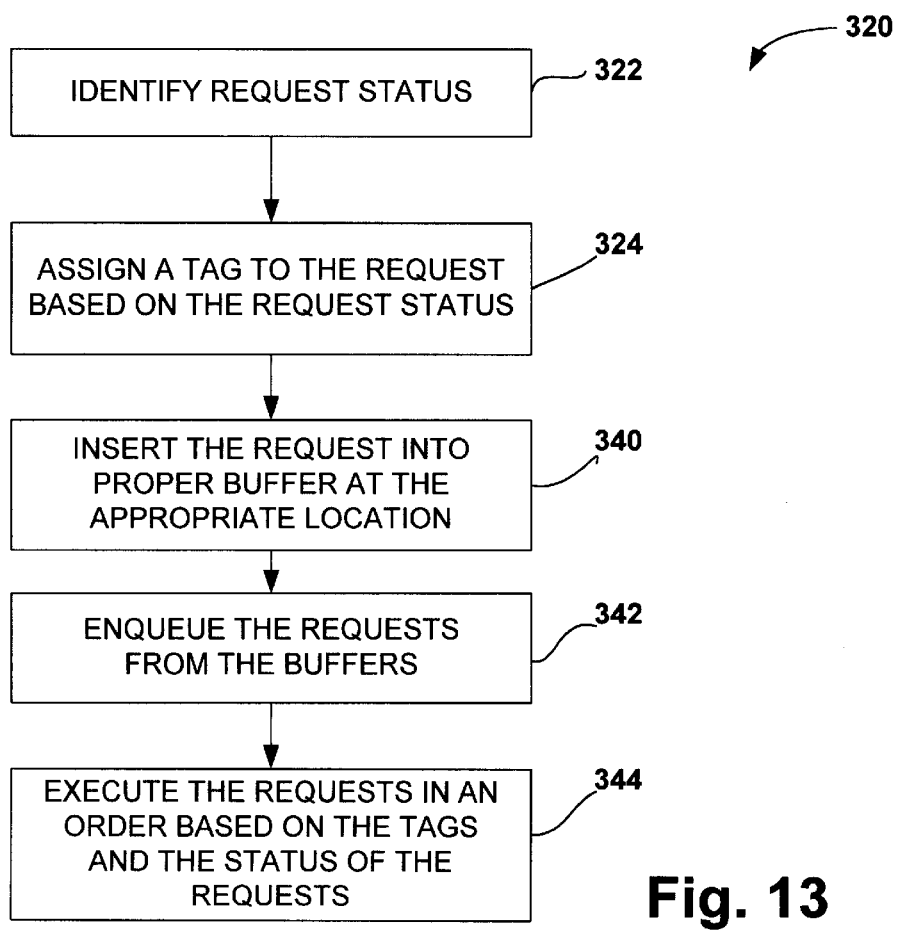
FIG. 13 is a flow chart illustrating a method of ordering access requests based on the status and a tag associated with the requests according to the present invention.

The system 300 implement the AGP ordering rules in accordance with the method of FIG. 13. In FIG. 13, a method 320 of ordering the access requests in conformity with the AGP ordering rules is provided. The method 320 begins by identifying a status of the access requests at Step 322. The control circuit 106 preferably determines the status of the request (e.g. whether the requests are low priority or high priority requests) by evaluating one or more bits within each request, which is accomplished when determining the proper location for inserting the access requests within the buffers 302 or 304. Alternatively, however, the status of the requests may be determined according to other methods and each such method is contemplated as falling within the scope of the present invention.

Figure 14:
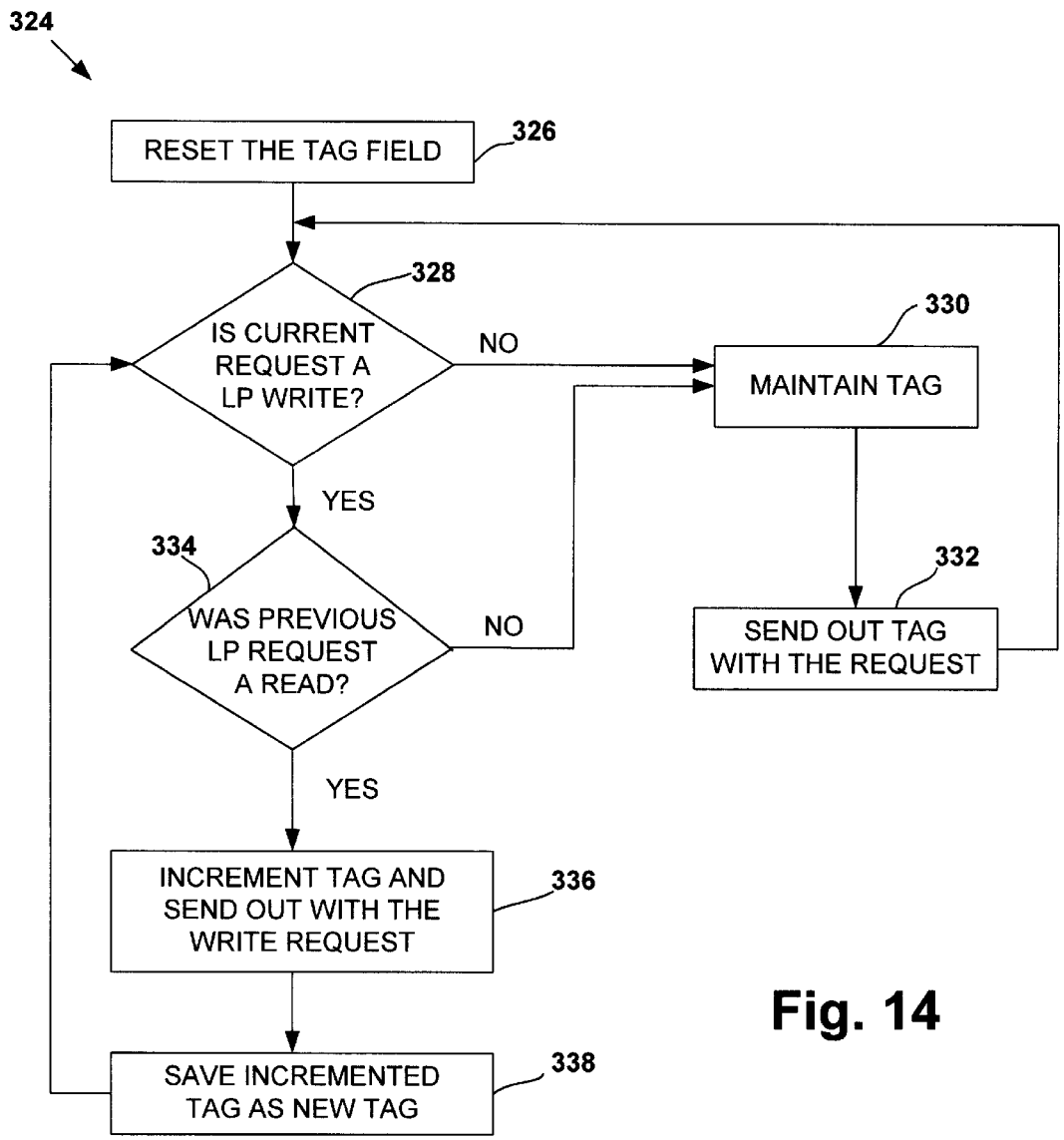
FIG. 14 is a flow chart illustrating a method of assigning a tag to a request based on the status of the request according to the present invention.

Once the status of the access requests are identified at Step 322, a tag is assigned to the requests at Step 324, wherein the assigned tag is a function of the status of the request. A preferred manner of assigning a tag to the requests is illustrated in FIG. 14. Preferably, the tag is a multi-bit field (e.g., five (5) bits) that attaches to each access request and becomes a portion of the request. For example, an access request may consist of forty (40) bits, wherein five (5) bits comprise the tag and the remaining 35 (35) bits comprise other substantive components of the request, such as the physical address, the length of the data being written or being read, etc. At the system reset, the tag field is reset at Step 326 by setting the tag to, for example, "0" (e.g., "00000").

When the control circuit 106 evaluates a new access request, it determines whether the current access request being evaluated is a low priority write request at Step 328. If the control circuit 106 determines that the request is not a low priority write request at Step 328 (NO), the tag value is maintained at Step 330 and the tag value is attached to the request and sent to the appropriate buffer 302 or 304 at Step 322. If at Step 328, the control circuit 106 determines that the access request is indeed a low priority write request (YES), the control circuit 106 then determines whether the previous low priority request was a read request at Step 334. If the previous low priority request was not a read request (NO), the tag value is again maintained at Step 330 and is attached to the low priority write request. If, however, the control circuit 106 determines that the previous low priority request was a read request at Step 334 (YES), the value of the tag is incremented (preferably by 1) and sent out with the low priority write request at Step 336 to the write buffer 304. The value of the incremented tag is then saved as the new tag value within the control circuit 106 at Step 338. Consequently, when another new access request is received by the control circuit 106, the new tag value will be maintained and attached to the request at Steps 330 and 332, or the new tag will be incremented to another value and attached to the request at Step 336.

Preferably, the control circuit 106 determines whether the previous low priority request was a read request at Step 334 by storing one or more bits in a memory location which are indicative of the status of the request (e.g., whether a read or write and whether a high or low priority). When a new low priority write request is issued, the control circuit 106 then evaluates the one or more stored bits to see if the past low priority request was a low priority read request. Alternatively, however, other methods may be utilized and are contemplated as falling within the scope of the present invention.

Returning to FIG. 13, once the tag is assigned to the access request at Step 324, the access request is inserted into the proper buffer (read buffer 302 or write buffer 304) at a specified location based on the status of the request (e.g., a high priority or a low priority request) at Step 340. The preferred manner in which the access request is inserted into one of the buffers has been discussed above in conjunction with FIGS. 4–11 and is omitted here for the sake of brevity. The access requests, once inserted within the buffers 302 or 304, shift back and forth (left and right) within the buffers depending upon their status and the status of later issued access requests and are eventually enqueued (i.e., exit the buffers) at Step 342. The enqueued access requests (a read request and a write request) are then sent to the arbitration circuit 306 at which point they are executed in an order which is based on value of the tags and the status of the requests at Step 344, preferably to conform with the AGP ordering rules.

Figure 15:
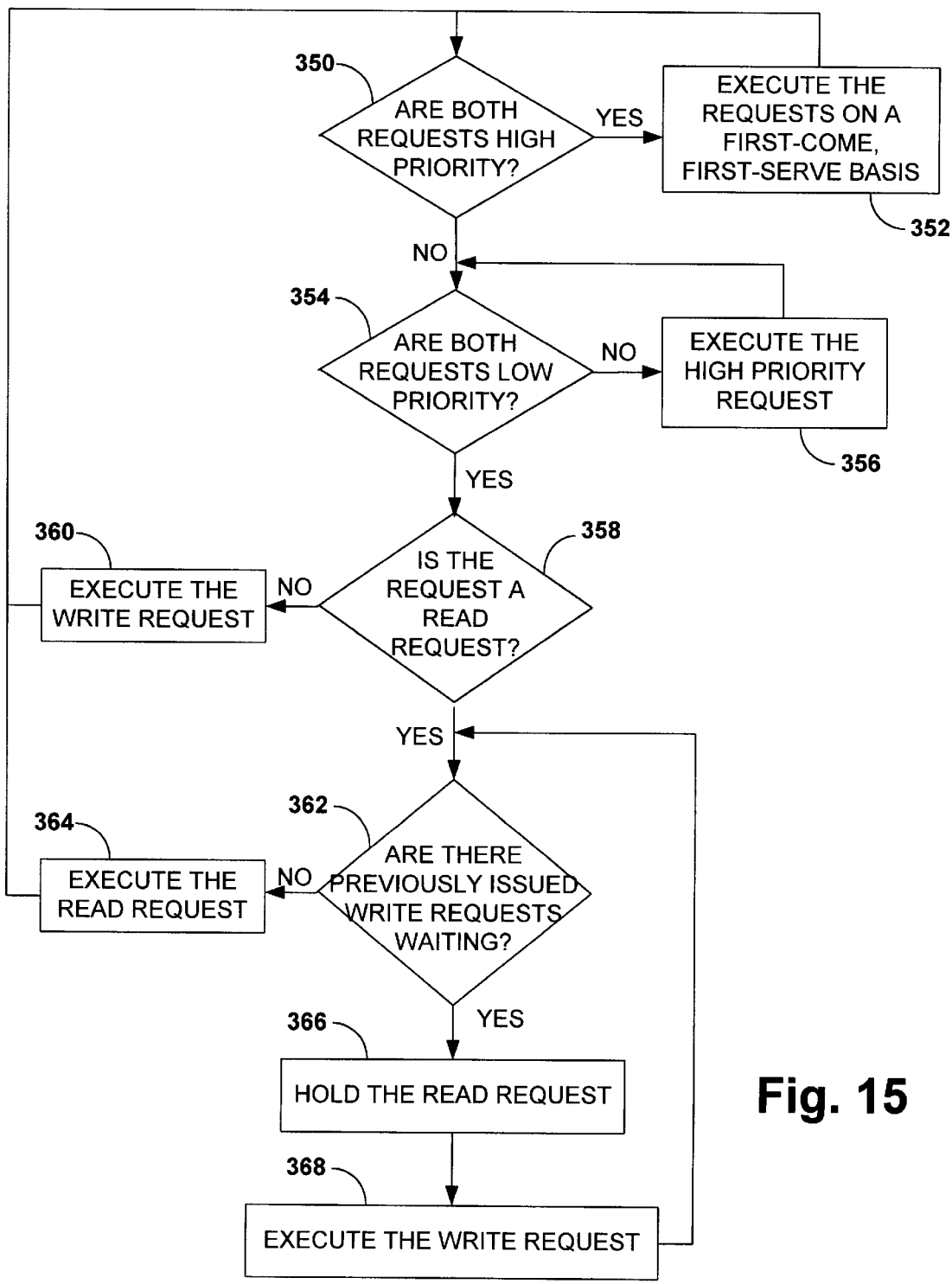
FIG. 15 is a flow chart illustrating a method of executing access requests in an order based on the status and the tags associated with the requests.

Preferably, the order of the requests (Step 344) is performed as illustrated in FIG. 15. Typically two access requests (a read request and a write request) are competing for execution. If, however, only one access request is provided, then that access request is immediately executed. When two requests are competing for execution, as is typical, the arbitration circuit 306 first determines whether the requests are high priority requests at Step 350. If both requests are high priority requests (YES), then the arbitration circuit 306 executes the two requests on a first-come, first-serve basis at Step 352 in conformance with the AGP ordering rules. If, however, both access requests are not high priority requests at Step 350 (NO), the arbitration circuit 306 determines whether both the access requests are low priority requests at Step 354. If both requests are not low priority requests (NO), then one of the requests is a high priority request and the other is a low priority request. In such event, the arbitration circuit 306 executes the high priority request first at Step 356 in conformance with the AGP ordering rules.

If the arbitration circuit 306 determines at Step 354 that both competing access requests are low priority requests (YES), the arbitration circuit 306 checks to see if the latest request (that is, the access request which is competing for execution for the first time, and not the request that lost the previous arbitration competition) is a read request at Step 358. If at Step 358 the most recent access request is a low priority write request (NO), the low priority write request is executed at Step 360 and the ordering of Step 344 begins again at Step 353. If, however, the most recent request is a low priority read request at Step 358 (YES), the arbitration circuit 306 checks to see if any previously issued write requests are waiting both in the write buffer 304 and in any subsequent intermediate queue which may exist within the arbitration circuit 306 at Step 362. If no such write requests are waiting, then the low priority read request is executed at Step 364. If, however, previously issued write requests (e.g., access requests that have been issued by the control circuit 106, but are still waiting in a buffer to be executed) are waiting for execution at Step 362 (YES), the arbitration circuit 306 holds the low priority read request at Step 366 and executes the waiting low priority write requests at Step 368 in conformance with the AGP ordering rules which requires that low priority read requests "push" low priority write requests.

Once Step 368 is completed, the ordering process of Step 344 returns to Step 362 and again inquires whether any previously issues low priority write requests are still waiting. Steps 362–368 are then again repeated until all previously issued low priority write requests are executed ahead of the low priority read requests, after which time the low priority read request is executed at Step 364.

Figure 16:
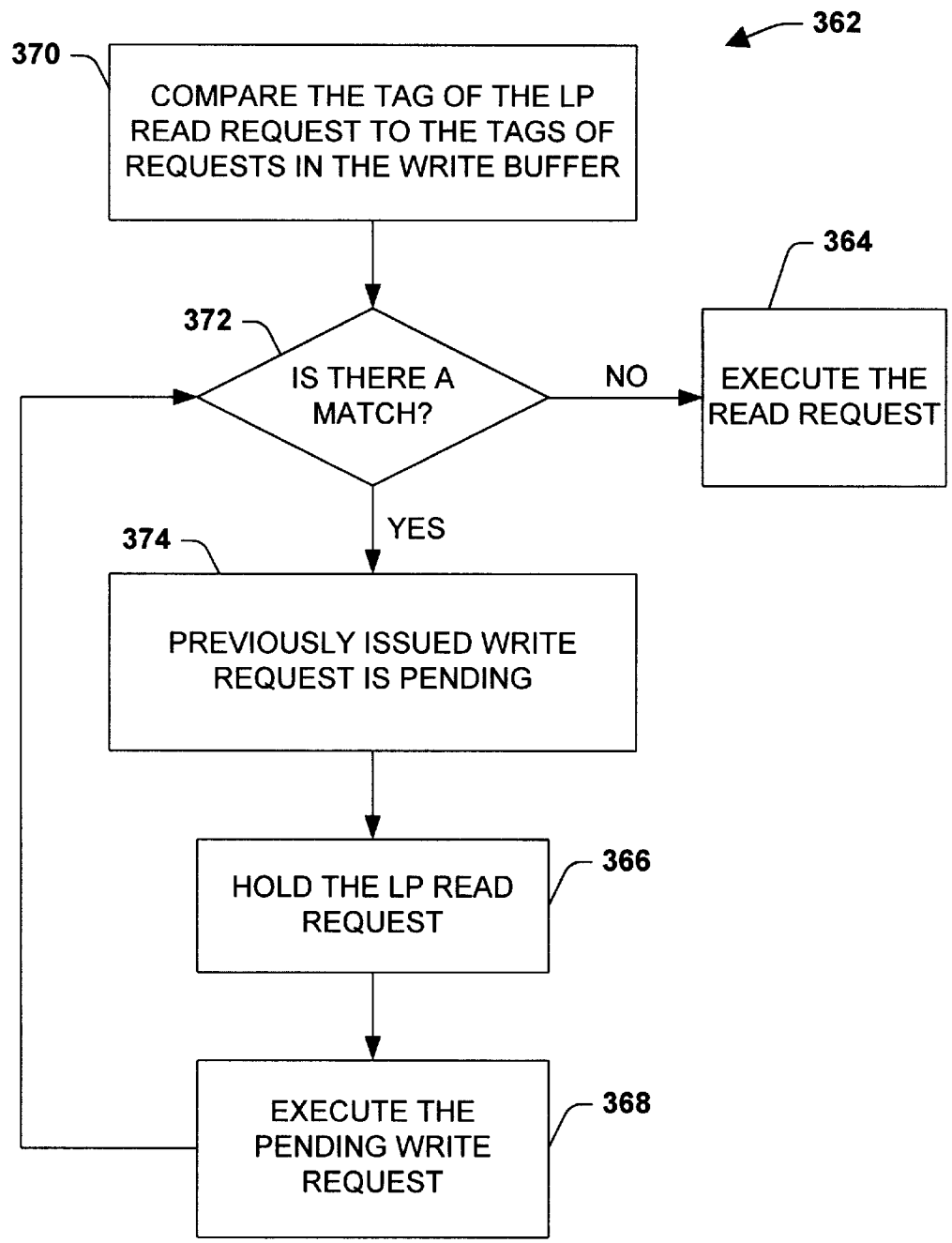
FIG. 16 is flow chart illustrating a method of determining whether previously issued write requests exist when a low priority read request is newly queued for execution according to the present invention.

The preferred manner in which the arbitration circuit 306 determines whether previously issued low priority write requests are waiting at Step 362 is illustrated in FIG. 16. The arbitration circuit 306 looks at the tag associated with the low priority read request which is to be executed and compares the value of the tag to the tag values of all the outstanding write requests which are within the write buffer 304 and any subsequent intermediate buffer which may exist within the arbitration circuit 306 at Step 370. If the tag of the low priority read request matches any of the write request tag values at Step 372 (YES), then the arbitration circuit 306 determines that a previously issued low priority write request is pending at Step 374. The low priority read request is then held at Step 366 by the arbitration circuit 306 and the pending previously issued low priority write request having the tag value match is executed at Step 368. Once executed, the arbitration circuit 306 checks to see if any more matches exist at Step 372. If not (NO), the low priority read request is executed at Step 364.

As seen from the above discussion of FIGS. 12–16, the present invention, via the arbitration circuit 306, executes the access requests based on the status of the requests and the tags associated with the various requests. Using both the status and the tags of the requests, the present invention is operable to easily arbitrate between competing requests and comply with the AGP ordering rules. By assigning tags having a particular value to access requests of a particular status it can be assured that any previously issued low priority write requests will be executed before a low priority read request so that the low priority read requests "push" the low priority write request. By incrementing the value of the tag to be attached to new access requests when a new low priority write request follows a low priority read request, one can identify which write requests were "previously issued" by the control circuit 106 with respect to any one particular low priority read request. Accordingly, the present invention orders access requests to the system memory 14 in accordance with the AGP ordering rules.

Figure 17:
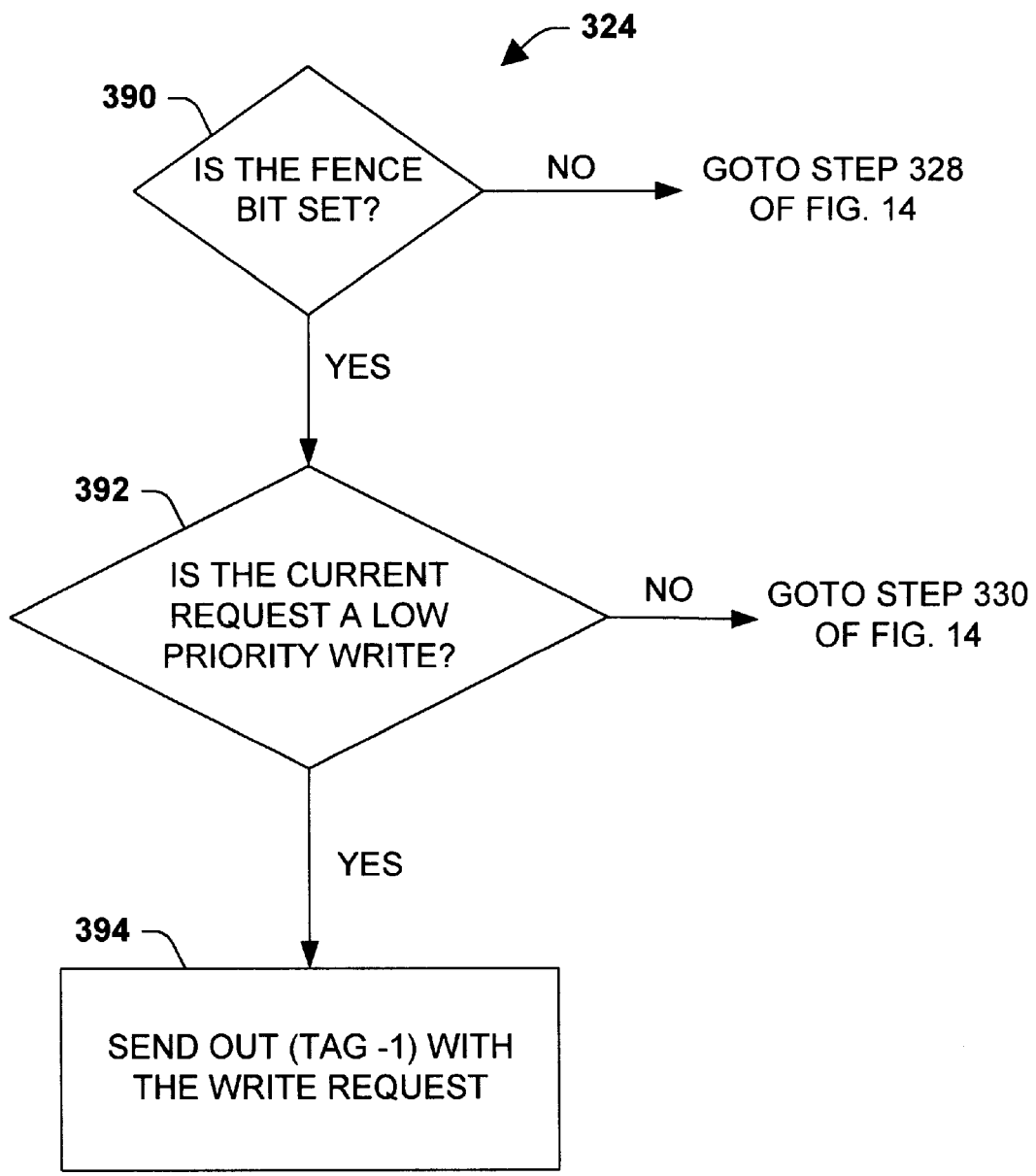
FIG. 17 is a flow chart illustrating a method of assigning a tag to a request based on the status of the request according to the present invention.
Figure 18:
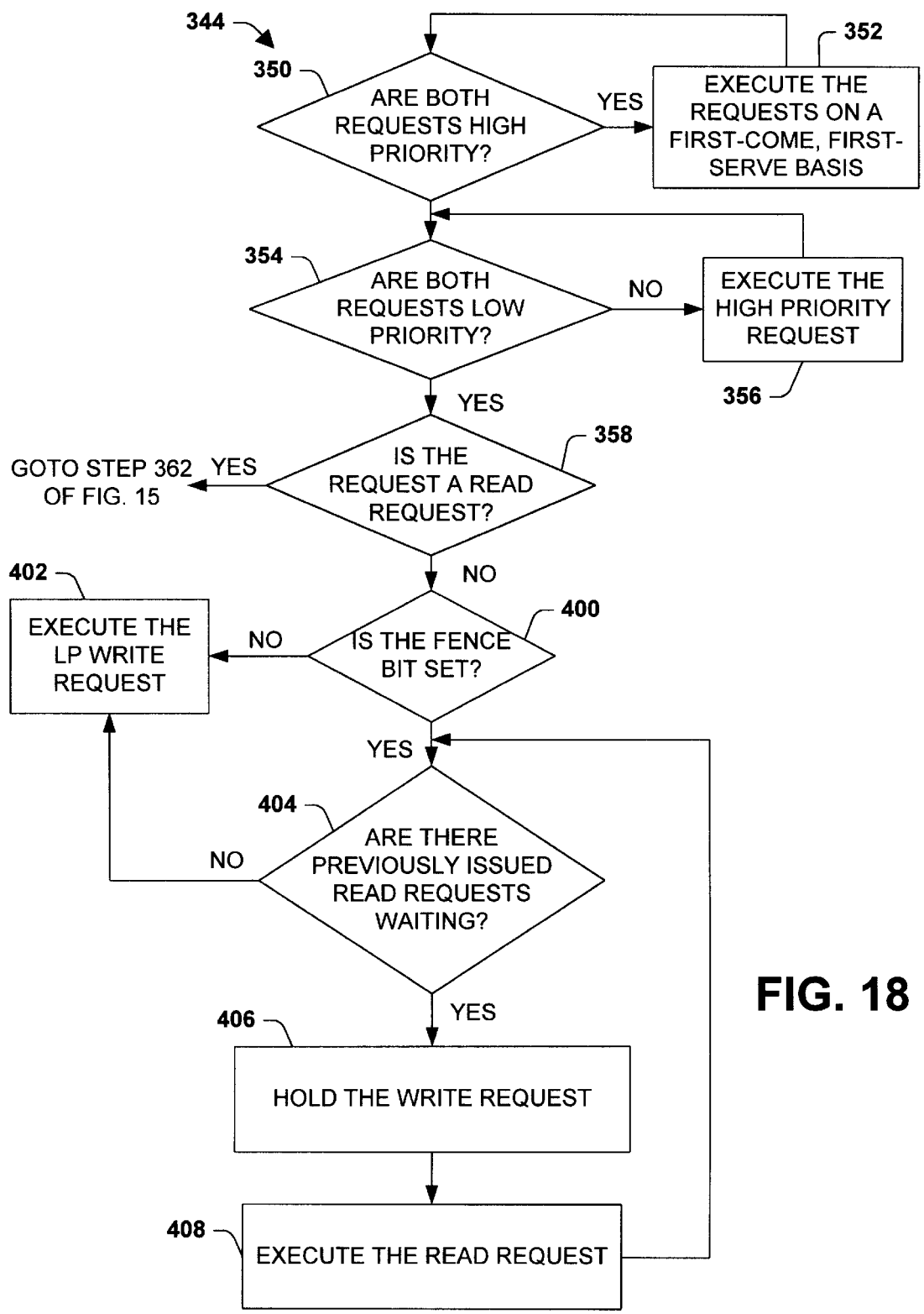
FIG. 18 is a flow chart illustrating a method of executing access requests in an order based on the status and the tags associated with the requests according to the present invention.
Figure 19:
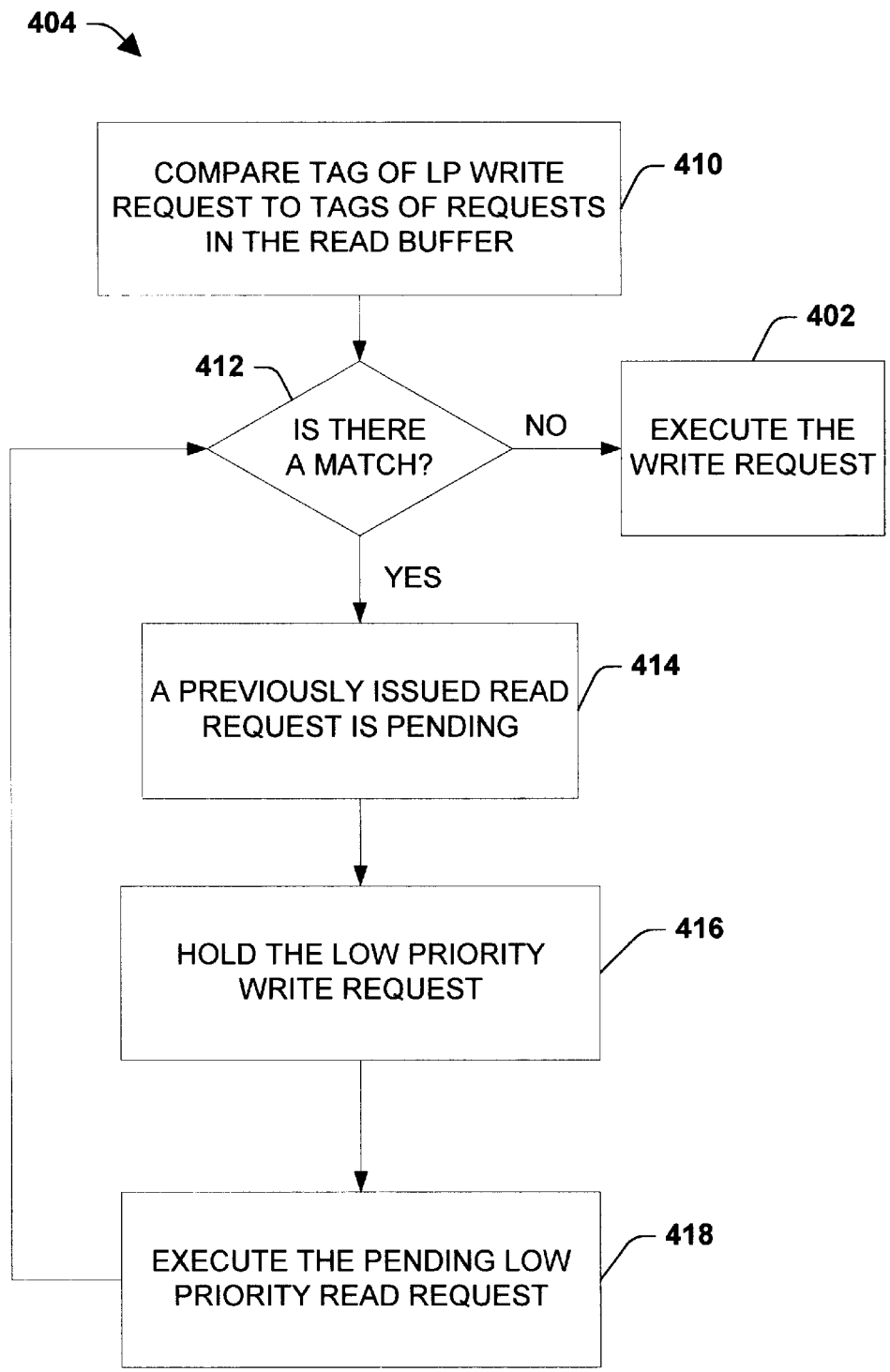
FIG. 19 is a flow chart illustrating a method of determining whether previously issued read requests exist when a low priority write request is newly queued for execution and a fence command is asserted according to the present invention.

According to yet another embodiment of the present invention, a method of ordering the access requests in conformity with the AGP rules is provided in conjunction with FIGS. 17–19. In particular, the method 320 of FIG. 13 is applicable to the ordering of access requests in situations in which a fence command is asserted. In order to ensure that certain transactions complete on the AGP interface before other transactions are executed, the execution of selected subsequent access requests is delayed until the execution of previous access requests is completed. The fence command guarantees the order in which low priority requests will be executed without delaying the issuance of subsequent low priority requests. Under certain circumstances, it is desirable for low priority write requests not to pass previously enqueued read requests. The fence command effectuates this desired situation by forcing all low priority write requests issued after the fence command to wait until all previously issued (prior to the fence command) low priority read requests are executed.

As discussed above in conjunction with FIG. 13, the control circuit 106 determines the status of new access requests by evaluating one or more bits within each request. In this case, in addition to determining whether the access request is a read or write request or whether the request is a high or low priority request, the control circuit 106 looks to see whether a fence command bit is set for low priority write requests. This additional piece of access request status information is then utilized at step 324 in assigning a tag value to the new access request. Exemplary details of step 324 are illustrated in the flow chart of FIG. 17.

At step 390, the control circuit 106 determines whether the fence command bit has been set. If not (NO), then no fence command has been asserted and the assignment of the tag value to the access request proceeds as discussed supra in conjunction with step 328 of FIG. 14. If, however, the fence command bit is asserted (YES), then the control circuit 106 determines whether the request is a low priority write request at step 392. Alternatively, however, steps 390 and 392 may be reversed as may desired (this reversal may be preferred in instances where a fence bit exists only within write requests). If the access request is not a low priority write request (NO), the method 320 continues as discussed supra in conjunction with step 330 of FIG. 14. Alternatively, if the current access request is a low priority write request at step 392 and the fence bit is set (YES), a tag value having a value of the current tag decremented, for example, by one (1) is sent out with the write request at step 394.

Preferably, the decremented value of the current tag is maintained in a second storage location by the control circuit 106 and thus is automatically attached to the access request when the conditions are met. Alternatively, when the conditions are met, the control circuit 106 may take the current tag value and decrement the tag value via logic circuitry and attach it to the access request. Other methods of assigning a decremented tag value may also be utilized to implement step 394 and each such method is contemplated as falling within the scope of the present invention.

The method 320 then continues in accordance with FIG. 13, wherein the access request is inserted into the appropriate buffer 302 or 304 at step 340 and ultimately the access request is enqueued from the buffers at step 342. An exemplary manner in which the access request is ordered at step 344 is illustrated in greater detail in FIGS. 18 and 19. Step 344 of FIG. 18 proceeds in a manner similar to FIG. 15 discussed supra to order the requests when one or more of the competing access requests is a high priority request (see steps 350–358). The method according to this alternative embodiment of the present invention, however, differs at step 358 if the low priority request is a write request (NO). If the arbitration circuit 306 identifies the newly enqueued access request as a low priority write request, the arbitration circuit 306 inquires whether the fence command bit is set at step 400. If not (NO), then the low priority write request is executed at step 402. If, however, the fence command bit is set (YES), the arbitration circuit 306 determines whether previously issued low priority read requests are awaiting execution at step 404. If no low priority read requests are waiting, then the write request is executed at step 402; otherwise, the arbitration circuit 306 holds the low priority write request at step 406 and executes the waiting low priority read request at step 408.

One exemplary manner in which the arbitration circuit 306 determines whether previously issued low priority read requests are waiting (step 404) utilizes the tag value associated with the competing low priority write request and is illustrated in FIG. 19. The arbitration circuit 306 compares the value of the tag associated with the low priority write request (which was decremented by one (1)) with the tag values of the low priority access requests which reside within the read buffer 302 and any internal buffers which may reside within the arbitration circuit 306 at step 410. If any of the tag values match at step 412 (YES), then a previously issued low priority read request is pending within the read buffer (step 414), and the arbitration circuit 306 orders the access requests to conform with the AGP ordering rules when a fence command is asserted. Steps 412–418 are then repeated so that all previously issued low priority read requests are executed before the low priority write request. When a match is not found at step 412 (NO), then no previously issued low priority read requests exist within the read buffer 302 and the write request is executed at step 402.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method of implementing a set of ordering rules for executing requests for access to a system memory, comprising the steps of:

identifying a request status for a new request for access to the system memory, wherein the step of identifying an access request status comprises determining whether the new access request is a high priority access request or a low priority access request;

assigning a tag to the new access request based on the status of the new access request, wherein the step of assigning a tag to the new access request comprises the steps of:

establishing a tag value based on the status of the new request and the status of a previous request; and coupling the tag value to the new request;

inserting the new access request into one of a read buffer or a write buffer at a specified location within one of the read or write buffer based on the status of the new access request;

enqueuing the new access request from the one of the buffers; and executing the new access request in an order with another access request from the other of the read or write buffer based on the request status and the tag of the new access request.

2. The method of claim 1, wherein the step of identifying an access request status comprises determining whether the new access request is a request to write data to the system memory or a request to read data from the system memory.

3. The method of claim 1, wherein the step of assigning a tag to the new access request comprises the steps of:

determining whether the new access request is a low priority write request;

determining whether a previous access request was a low priority read request;

establishing a tag value based on the determinations; and coupling the tag value to the new access request.

4. The method of claim 1, wherein the step of executing the new access request in an order with another access request based on the status and the tag of the new access request comprises:

determining whether the new access request and the other access request are high priority or low priority requests; and executing the new access request and the other access request on a first-come, first-serve basis if both access requests are high priority requests.

5. The method of claim 1, wherein identifying an access request status comprises determining whether a fence command has been asserted.

6. The method of claim 1, wherein assigning a tag to the new access request comprises the steps of:

establishing a tag value based on the status of the request; and coupling the tag value to the new request.

7. A method of implementing a set of ordering rules for executing requests for access to a system memory, comprising the steps of:

identifying a request status for a new request for access to the system memory;

assigning a tag to the new access request based on the status of the new access request, wherein the step of assigning a tag to the new access request comprises the steps of:

determining whether the new access request is a low priority write request;

determining whether a previous access request was a low priority read request;

establishing a tag value based on the determinations and wherein the step of establishing a tag value comprises:

incrementing a previous tag value if the new access request is a low priority write and if the previous access request was a low priority read request; and maintaining the previous tag value otherwise;

coupling the tag value to the new access request;

inserting the new access request into one of a read buffer or a write buffer at a specified location within one of the read or write buffer based on the status of the new access request;

enqueuing the new access request from the one of the buffers; and executing the new access request in an order with another access request from the other of the read or write buffer based on the request status and the tag of the new access request.

8. A method of implementing a set of ordering rules for executing requests for access to a system memory, comprising the steps of:

identifying a request status for a new request for access to the system memory;

assigning a tag to the new access request based on the status of the new access request;

inserting the new access request into one of a read buffer or a write buffer at a specified location within one of the read or write buffer based on the status of the new access request, wherein the step of inserting the new access request into a specified buffer at a specified location based on the request status comprises:

identifying a location within the buffer for inputting the access request;

shifting one or more previously requested access requests within the buffer if necessary to make room for the access request at the identified location; and inserting the access request into the buffer at the identified location;

enqueuing the new access request from the one of the buffers; and executing the new access request in an order with another access request from the other of the read or write buffer based on the request status and the tag of the new access request.

9. A method of implementing a set of ordering rules for executing requests for access to a system memory, comprising the steps of:

identifying a request status for a new request for access to the system memory;

assigning a tag to the new access request based on the status of the new access request;

inserting the new access request into one of a read buffer or a write buffer at a specified location within one of the read or write buffer based on the status of the new access request;

enqueuing the new access request from the one of the buffers; and executing the new access request in an order with another access request from the other of the read or write buffer based on the request status and the tag of the new access request, wherein the step of executing the new access request in an order with another access request based on the status and the tag of the new access request comprises:

determining whether the new access request and the other access request are high priority or low priority requests; and executing the new access request and the other access request on a first-come first-serve basis if both access requests are high priority requests;

determining whether the new access request is a low priority read request if both the new access request and the other access request are low priority requests; and executing the new access request before the other access request if the new access request is a low priority write request and the other access request is a previously issued low priority read request.

10. A method of implementing a set of ordering rules for executing requests for access to a system memory, comprising the steps of:

identifying a request status for a new request for access to the system memory;

assigning a tag to the new access request based on the status of the new access request;

inserting the new access request into one of a read buffer or a write buffer at a specified location within one of the read or write buffer based on the status of the new access request;

enqueuing the new access request from the one of the buffers; and executing the new access request in an order with another access request from the other of the read or write buffer based on the request status and the tag of the new access request, wherein the step of executing the new access request in an order with another access request based on the status and the tags of the requests comprises executing the request having a higher priority if both access requests are simultaneously neither high priority nor low priority requests.

11. A method of implementing a set of ordering rules for executing requests for access to a system memory, comprising the steps of:

identifying a request status for a new request for access to the system memory;

assigning a tag to the new access request based on the status of the new access request;

inserting the new access request into one of a read buffer or a write buffer at a specified location within one of the read or write buffer based on the status of the new access request;

enqueuing the new access request from the one of the buffers; and executing the new access request in an order with another access request from the other of the read or write buffer based on the request status and the tag of the new access request, wherein the step of executing the new access request in an order with another access request based on the status and the tags of the requests comprises:

determining whether the new access request is a low priority read request;

determining whether previously issued low priority write requests are waiting to be executed if the new access request is a low priority read request;

executing the new access request if the new access request is a low priority read request and no previously issued low priority write requests are waiting; and holding the new access request if the new access request is a low priority read request and a previously issued low priority write request is waiting.

12. The method of claim 11, wherein the step of determining whether previously issued low priority write requests are waiting comprises:

comparing the tag of the new access request to a tag of one or more write requests residing in the write buffer; and determining that one or more previously issued low priority write requests are waiting if the tag of the new access request matches at least one of the tags of the one or more write requests residing in the write buffer.

13. A method of implementing a set of ordering rules for executing requests for access to a system memory, comprising the steps of:
- identifying a request status for a new request for access to the system memory, wherein the status of the request includes whether a fence command has been asserted and whether the new access request is a low priority write request, and wherein if the fence command has been asserted and the access request is a low priority write command, a current tag value is decremented to a decremented tag value;
- assigning a tag to the new access request based on the status of the new access request, wherein assigning a tag to the new access request comprises the steps of:
  - establishing a tag value based on the status of the request; and
  - coupling the tag value to the new request;
- inserting the new access request into one of a read buffer or a write buffer at a specified location within one of the read or write buffer based on the status of the new access request;
- enqueuing the new access request from the one of the buffers; and
- executing the new access request in an order with another access request from the other of the read or write buffer based on the request status and the tag of the new access request.

14. A method of implementing a set of ordering rules for executing requests for access to a system memory, comprising the steps of:
- identifying a request status for a new request for access to the system memory;
- assigning a tag to the new access request based on the status of the new access request;
- inserting the new access request into one of a read buffer or a write buffer at a specified location within one of the read or write buffer based on the status of the new access request;
- enqueuing the new access request from the one of the buffers; and
- executing the new access request in an order with another access request from the other of the read or write buffer based on the request status and the tag of the new access request, wherein the step of executing the new access request in an order with another access request based on the status and the tag of the new access request comprises:
  - determining whether the new access request is a low priority write request;
  - determining whether a fence command bit is set in the new access request if the request is a low priority write request;
  - determining whether previously issued low priority read requests are waiting to be executed if the new access request is a low priority write request and the fence command bit is set;
  - executing the new access request if the new access request is a low priority write request, the fence command bit is set and no previously issued low priority read requests are waiting; and
  - holding the new access request if the new access request is a low priority write request, the fence command bit is set and a previously issued low priority read request is waiting.

15. The method of claim 14, wherein the step of determining whether previously issued low priority read requests are waiting comprises:
- comparing the tag of the new access request to a tag of one or more read requests in the read buffer; and
- determining that one or more previously issued low priority read requests are waiting if the tag of the new access request matches at least one of the tags of the one or more read requests residing in the read buffer.

* * * * *